US012542913B2

(12) United States Patent
Rosewarne et al.

(10) Patent No.: US 12,542,913 B2
(45) Date of Patent: *Feb. 3, 2026

(54) METHOD, APPARATUS AND SYSTEM FOR ENCODING AND DECODING A BLOCK OF VIDEO SAMPLES

(71) Applicant: CANON KABUSHIKI KAISHA, Tokyo (JP)

(72) Inventors: Christopher James Rosewarne, Concord (AU); Iftekhar Ahmed, Lane Cove North (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,443

(22) Filed: Jul. 9, 2024

(65) Prior Publication Data

US 2025/0008121 A1 Jan. 2, 2025

Related U.S. Application Data

(63) Continuation of application No. 17/642,090, filed as application No. PCT/AU2020/050799 on Aug. 4, 2020, now Pat. No. 12,081,773.

(30) Foreign Application Priority Data

Sep. 17, 2019 (AU) ................ 2019232797

(51) Int. Cl.
*H04N 19/174* (2014.01)
*H04N 19/124* (2014.01)
(Continued)

(52) U.S. Cl.
CPC ......... *H04N 19/174* (2014.11); *H04N 19/124* (2014.11); *H04N 19/46* (2014.11); *H04N 19/70* (2014.11); *H04N 19/96* (2014.11)

(58) Field of Classification Search
CPC .... H04N 19/174; H04N 19/124; H04N 19/46; H04N 19/70; H04N 19/96; H04N 19/167;
(Continued)

(56) References Cited

U.S. PATENT DOCUMENTS

2018/0020241 A1* 1/2018 Li ..................... H04N 19/13
2018/0376153 A1 12/2018 Gokhale
(Continued)

FOREIGN PATENT DOCUMENTS

| CN | 1123992 A | 6/1996 |
| CN | 105532000 A | 4/2016 |
| WO | 2018129322 A1 | 7/2018 |

OTHER PUBLICATIONS

Bross et al. ("Versatile Video Coding (Draft 6)", Joint Video Experts Team (JVET) of ITU-T SG16 WP 3 and ISO/IEC JTC1/SC29/WG11 15th Meeting: Gothenburg, SE, Jul. 3-12, 2019, JVET-O2001-vE). (Year: 2019).*
(Continued)

*Primary Examiner* — Matthew K Kwan
(74) *Attorney, Agent, or Firm* — Canon U.S.A., Inc. IP Division

(57) ABSTRACT

A method of decoding a plurality of coding units from a bitstream to produce an image frame, the coding units being the result of decompositions of coding tree units, the plurality of coding units forming one or more contiguous portions of the bitstream. The method comprises determining a subdivision level for each portion of the bitstream, each subdivision level being applicable to the coding units of the respective contiguous portion of the bitstream; decoding a quantisation parameter delta for each of a number of areas, each area based on decomposition of coding tree units into coding units of each contiguous portion of the bitstream and the corresponding determined subdivision level; determining a quantisation parameter for each area according to (Continued)

the decoded delta quantisation parameter for the area and the quantisation parameter of an earlier coding unit of the image frame; decoding using the determined quantisation parameter of each area.

14 Claims, 22 Drawing Sheets

(51) Int. Cl.
    *H04N 19/46*     (2014.01)
    *H04N 19/70*     (2014.01)
    *H04N 19/96*     (2014.01)

(58) Field of Classification Search
CPC .. H04N 19/463; H04N 19/176; H04N 19/119; H04N 19/513; H04N 19/132
USPC .................................................... 375/240.03
See application file for complete search history.

(56) References Cited

U.S. PATENT DOCUMENTS

2021/0006786 A1*   1/2021   Gao ........................ H04N 19/70
2021/0400275 A1*   12/2021   De Lagrange ....... H04N 19/186

OTHER PUBLICATIONS

Lagrange et al. ("CE7-related: Quantization Group size uniformity", Joint Video Experts Team (JVET) of ITU-T SG 16 WP 3 and ISO/IEC JTC 1/SC 29/WG 11 13th Meeting: Marrakech, MA, Jan. 9-18, 2019, JVET-M0113-v2). (Year: 2019).*
Wang Fang, Design of Intra Frame Compression Method and Practical Program in Videoconference System, Thesis for Master's Degree, Dalian Maritime University, Feb. 2003, English abstract on sixth page.
Wang, Jianpeng, et al., Iterative correlation noise refinement method in unidirectional distributed video coding, Journal of South China University of Technology (Natural Science Edition), vol. 47, No. 4, Apr. 2019, English abstract is on eighth page.
Pablo Caballero, et al., Optimizing Network Slicing via Virtual Resource Pool Partitioning, 2019 International Symposium on Modeling and Optimization in Mobile, Ad Hoc, and Wireless Networks (WiOPT), Avignon, France, 2019.

* cited by examiner

METHOD, APPARATUS AND SYSTEM FOR ENCODING AND DECODING A BLOCK OF VIDEO SAMPLES

REFERENCE TO RELATED APPLICATION(S)

This application is a continuation application of U.S. patent application Ser. No. 17/642,090, filed on Mar. 10, 2022, which is the National Phase application of PCT Application No. PCT/AU2020/050799, filed on Aug. 4, 2020 and titled "METHOD, APPARATUS AND SYSTEM FOR ENCODING AND DECODING A BLOCK OF VIDEO SAMPLES". This application claims the benefit under 35 U.S.C. § 119 of the filing date of Australian Patent Application No. 2019232797, filed Sep. 17, 2019. Each of the above-cited patent applications is hereby incorporated by reference in its entirety as if fully set forth herein.

TECHNICAL FIELD

The present invention relates generally to digital video signal processing and, in particular, to a method, apparatus and system for encoding and decoding a block of video samples. The present invention also relates to a computer program product including a computer readable medium having recorded thereon a computer program for encoding and decoding a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. Use cases such as immersive video necessitate real-time encoding and decoding of such higher formats, for example cube-map projection (CMP) may use an 8 K format even though a final rendered 'viewport' utilises a lower resolution. VVC must be implementable in contemporary silicon processes and offer an acceptable trade-off between the achieved performance versus the implementation cost. The implementation cost can be considered for example, in terms of one or more of silicon area, CPU processor load, memory utilisation and bandwidth. Higher video formats may be processed by dividing the frame area into sections and processing each section in parallel. A bitstream constructed from multiple sections of the compressed frame that is still suitable for decoding by a "single-core" decoder, i.e., frame-level constraints, including bit-rate, are apportioned to each section according to application needs.

Video data includes a sequence of frames of image data, each frame including one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Due to the use of a decorrelated YCbCr signal, the statistics of the luma channel differ markedly from those of the chroma channels. A primary difference is that after quantisation, the chroma channels contain relatively few significant coefficients for a given block compared to the coefficients for a corresponding luma channel block. Moreover, the Cb and Cr channels may be sampled spatially at a lower rate (subsampled) compared to the luma channel, for example half horizontally and half vertically-known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8 K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' either for both the luma channel and the chroma channels (a 'shared tree') or a separate tree each for the luma channel and the chroma channels. A coding tree defines a decomposition of the area of the CTU into a set of blocks, also referred to as 'coding blocks' (CBs). When a shared tree is in use a single coding tree specifies blocks both for the luma channel and the chroma channels, in which case the collections of collocated coding blocks are referred to as 'coding units' (CUs), i.e., each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). A single tree with CUs spanning the colour channels of 4:2:0 chroma format video data result in chroma blocks half the width and height of the corresponding luma blocks. When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction unit (PU) of the contents (sample values) of the corresponding area of frame data is generated (a 'prediction unit'). Further, a representation of the difference (or 'spatial domain' residual) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. This transform is applied separably, i.e. that is the two-dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

VVC features an intra-frame prediction and inter-frame prediction. Intra-frame prediction involves the use of previously processed samples in a frame being used to generate a prediction of a current block of samples in the frame. Inter-frame prediction involves generating a prediction of a current block of samples in a frame using a block of samples obtained from a previously decoded frame. The block of samples obtained from a previously decoded frame is offset from the spatial location of the current block according to a motion vector, which often has filtering being applied. Intra-frame prediction blocks can be (i) a uniform sample value ("DC intra prediction"), (ii) a plane having an offset and horizontal and vertical gradient ("planar intra prediction"), (iii) a population of the block with neighbouring samples applied in a particular direction ("angular intra prediction") or (iv) the result of a matrix multiplication using neighbouring samples and selected matrix coefficients. Further discrepancy between a predicted block and the corresponding input samples may be corrected to an extent by encoding a 'residual' into the bitstream. The residual is generally transformed from the spatial domain to the frequency domain to form residual coefficients (in a 'primary transform domain'), which may be further transformed by application of a 'secondary transform' (to produce residual coefficients in a 'secondary transform domain'). Residual coefficients are quantised according to a quantisation parameter, resulting in a loss of accuracy of the reconstruction of the samples produced at the decoder but with a reduction in bitrate in the bitstream. The quantisation parameter may vary from frame to frame and within each frame. Varying the quantisation parameter within a frame is typical for 'rate controlled' encoders. Rate controlled encoders attempt to produce a bitstream with a substantially constant bitrate regardless of the statistics of the received input samples, such as noise properties, degree of motion. Since bitstreams are typically conveyed over networks with limited bandwidth, rate control is a widespread technique to ensure reliable performance over a network regardless of variation of the original frames input to an encoder. Where frames are encoded in parallel sections, flexibility in usage of rate control is desirable, as different sections may have different requirements in terms of desired fidelity.

SUMMARY

It is an object of the present invention to substantially overcome, or at least ameliorate, one or more disadvantages of existing arrangements.

One aspect of the present disclosure provides a method of decoding a plurality of coding units from a bitstream to produce an image frame, the coding units being the result of decompositions of coding tree units, the plurality of coding units forming one or more contiguous portions of the bitstream, the method comprising: determining a subdivision level for each of the one or more contiguous portions of the bitstream, each subdivision level being applicable to the coding units of the respective contiguous portion of the bitstream; decoding a quantisation parameter delta for each of a number of areas, each area based on decomposition of coding tree units into coding units of each contiguous portion of the bitstream and the corresponding determined subdivision level; determining a quantisation parameter for each area according to the decoded delta quantisation parameter for the area and the quantisation parameter of an earlier coding unit of the image frame; decoding the plurality of coding units using the determined quantisation parameter of each area to produce the image frame.

According to another aspect, each area is based on a comparison of a subdivision level associated with the coding units to the determined subdivision level for the corresponding contiguous portion.

According to another aspect, a quantisation parameter delta is determined for each area is a corresponding coding tree has a subdivision level less than or equal to the determined subdivision level for the corresponding contiguous portion.

According to another aspect, a new area is set for any node in the coding tree unit with a subdivision level less than or equal to the corresponding determined subdivision level.

According to another aspect, the subdivision level determined for each contiguous portion comprises a first subdivision level for luma coding units and a second subdivision level for chroma coding units of the contiguous portion.

According to another aspect, the first and second subdivision levels are different.

According to another aspect, the method further comprises decoding a flag indicating that partition constraints of a sequence parameter set associated with the bitstream can be overwritten.

According to another aspect, the determined subdivision level for each of the one or more contiguous portions includes a maximum luma coding unit depth for the area.

According to another aspect, the determined subdivision level for each of the one or more contiguous portions includes a maximum chroma coding unit depth for the corresponding area.

According to another aspect, the determined subdivision level for one of the contiguous portions is adjusted to maintain an offset relative to a deepest allowed subdivision level decoded for the partition constraints of the bitstream.

Another aspect of the present disclosure provides a non-transitory computer-readable medium having a computer program stored thereon to implement a method of decoding a plurality of coding units from a bitstream to produce an image frame, the coding units being the result of decompositions of coding tree units, the plurality of coding units forming one or more contiguous portions of the bitstream, the method comprising: determining a subdivision level for each of the one or more contiguous portions of the bitstream, each subdivision level being applicable to the coding units of the respective contiguous portion of the bitstream; decoding a quantisation parameter delta for each of a number of areas, each area based on decomposition of coding tree units into coding units of each contiguous portion of the bitstream and the corresponding determined subdivision level; determining a quantisation parameter for each area according to the decoded delta quantisation parameter for the area and the quantisation parameter of an earlier coding unit of the image frame; and decoding the plurality of coding units using the determined quantisation parameter of each area to produce the image frame.

Another aspect of the present disclosure provides a video decoder configured to implement a method of decoding a plurality of coding units from a bitstream to produce an image frame, the coding units being the result of decompositions of coding tree units, the plurality of coding units forming one or more contiguous portions of the bitstream, the method comprising: determining a subdivision level for each of the one or more contiguous portions of the bitstream, each subdivision level being applicable to the coding units of the respective contiguous portion of the bitstream; decoding a quantisation parameter delta for each of a number of areas, each area based on decomposition of coding tree units into coding units of each contiguous portion of the bitstream and the corresponding determined subdivision level; determining a quantisation parameter for each area according to the decoded delta quantisation parameter for the area and the quantisation parameter of an earlier coding unit of the image frame; and decoding the plurality of coding units using the determined quantisation parameter of each area to produce the image frame.

Another aspect of the present disclosure provides a system, comprising: a memory; and a processor, wherein the processor is configured to execute code stored on the memory for implementing a method of decoding a plurality of coding units from a bitstream to produce an image frame, the coding units being the result of decompositions of coding tree units, the plurality of coding units forming one or more contiguous portions of the bitstream, the method comprising: determining a subdivision level for each of the one or more contiguous portions of the bitstream, each subdivision level being applicable to the coding units of the respective contiguous portion of the bitstream; decoding a quantisation parameter delta for each of a number of areas, each area based on decomposition of coding tree units into coding units of each contiguous portion of the bitstream and the corresponding determined subdivision level; determining a quantisation parameter for each area according to the decoded delta quantisation parameter for the area and the quantisation parameter of an earlier coding unit of the image frame; and decoding the plurality of coding units using the determined quantisation parameter of each area to produce the image frame.

Another aspect of the present disclosure provides a method of decoding a coding unit of a coding tree from a coding tree unit of an image frame from a video bitstream, the coding unit having a primary colour channel and at least one secondary colour channel, the method comprising: determining a coding unit including the primary colour channel and the at least one secondary colour channel according to decoded split flags of the coding tree unit; decoding a first index to select a kernel for the primary colour channel and a second index to select a kernel for the at least one secondary colour channel; selecting a first kernel according to the first index and a second kernel according to the second index; and decoding the coding unit by applying the first kernel to residual coefficients of the primary colour channel and the second kernel to residual coefficients of the at least one secondary colour channel.

According to another aspect, the first or second index is decoded immediately after decoding a position of a last significant residual coefficient of the coding unit.

According to another aspect, the single residual coefficient is decoded for a plurality of secondary colour channels.

According to another aspect, the single residual coefficient is decoded for a single secondary colour channels.

According to another aspect, the first index and the second index are independent of one another.

According to another aspect, the first and second kernels depend on intra prediction modes for the primary and the at least one secondary colour channel, respectively.

According to another aspect, the first and second kernels relate to a block size of the primary channel and a block size of the at least one secondary colour channel, respectively.

According to another aspect, the second kernel relates to a chroma subsampling ratio of the encoded bitstream.

According to another aspect, each of the kernels implements a non-separable secondary transform.

According to another aspect, the coding unit comprises two secondary colour channels and a separate index is decoded for each of the secondary colour channels.

Another aspect of the present disclosure provides a non-transitory computer-readable medium having a computer program stored thereon to implement a method of decoding a coding unit of a coding tree from a coding tree unit of an image frame from a video bitstream, the coding unit having a primary colour channel and at least one secondary colour channel, the method comprising: determining a coding unit including the primary colour channel and the at least one secondary colour channel according to decoded split flags of the coding tree unit; decoding a first index to select a kernel for the primary colour channel and a second index to select a kernel for the at least one secondary colour channel; selecting a first kernel according to the first index and a second kernel according to the second index; and decoding the coding unit by applying the first kernel to residual coefficients of the primary colour channel and the second kernel to residual coefficients of the at least one secondary colour channel.

Another aspect of the present disclosure provides a video decoder configured to implement a method of decoding a coding unit of a coding tree from a coding tree unit of an image frame from a video bitstream, the coding unit having a primary colour channel and at least one secondary colour channel, the method comprising: determining a coding unit including the primary colour channel and the at least one secondary colour channel according to decoded split flags of the coding tree unit; decoding a first index to select a kernel for the primary colour channel and a second index to select a kernel for the at least one secondary colour channel; selecting a first kernel according to the first index and a second kernel according to the second index; and decoding the coding unit by applying the first kernel to residual coefficients of the primary colour channel and the second kernel to residual coefficients of the at least one secondary colour channel.

Another aspect of the present disclosure provides a system, comprising: a memory; and a processor, wherein the processor is configured to execute code stored on the memory for implementing a method of decoding a coding unit of a coding tree from a coding tree unit of an image frame from a video bitstream, the coding unit having a primary colour channel and at least one secondary colour channel, the method comprising: determining a coding unit including the primary colour channel and the at least one secondary colour channel according to decoded split flags of the coding tree unit; decoding a first index to select a kernel for the primary colour channel and a second index to select a kernel for the at least one secondary colour channel; selecting a first kernel according to the first index and a second kernel according to the second index; and decoding the coding unit by applying the first kernel to residual coefficients of the primary colour channel and the second kernel to residual coefficients of the at least one secondary colour channel.

Other aspects are also disclosed.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
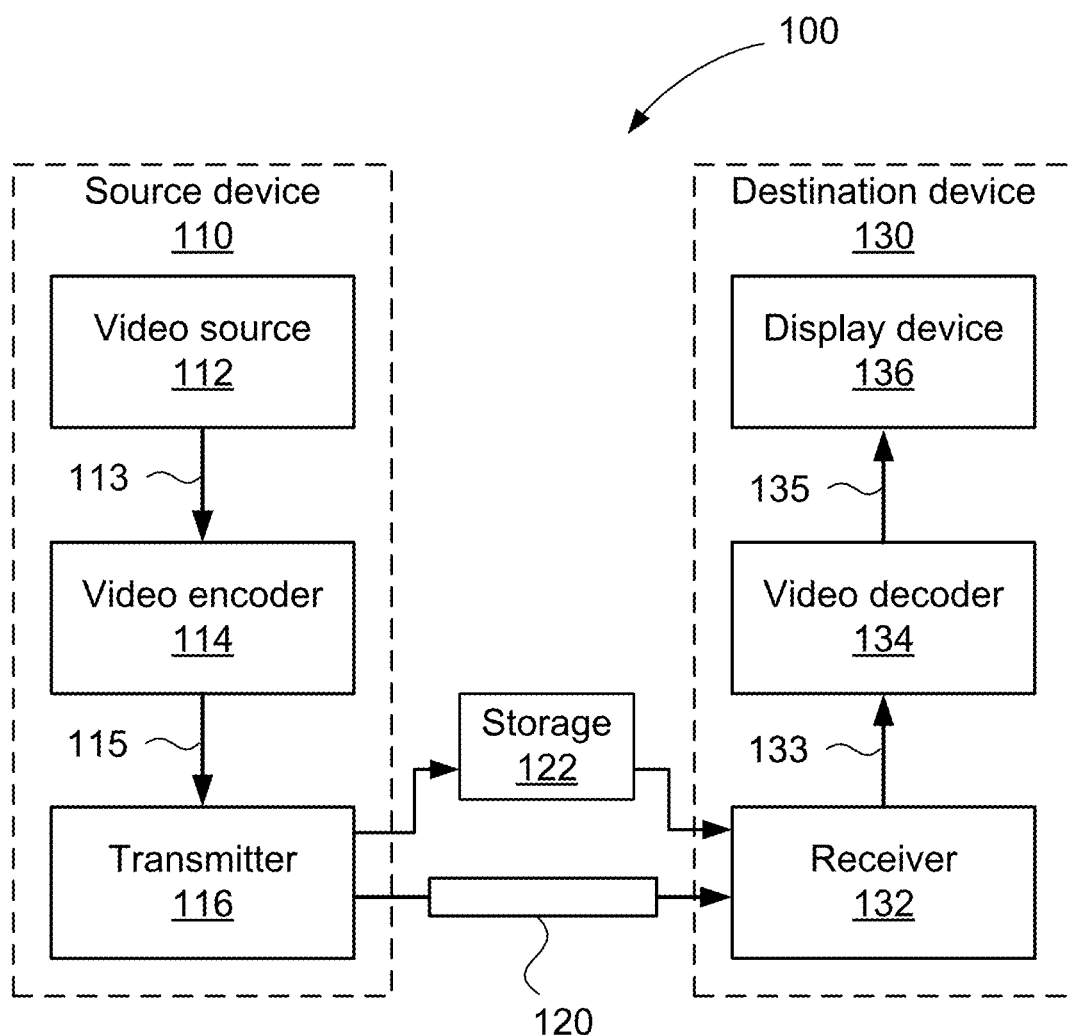
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

Rate-controlled video encoders require flexibility to adjust the quantisation parameter at a granularity suitable for the block partitioning constraints. Block partitioning constraints may differ from one portion of a frame to another, for example, where multiple video encoders operate in parallel to compress each frame. The granularity of the area for which quantisation parameter adjustment is required varies accordingly. Moreover, control of the applied transform selection, including potential application of a secondary transform, is applied within the scope of the prediction signal from which the residual being transformed was generated. In particular, for intra prediction, separate modes are available for luma blocks and chroma blocks, as they may use different intra prediction modes.

Some sections of a video make a greater contribution to the fidelity of a rendered viewport than others and can be allocated greater bitrate and greater flexibility in block structure and variance of quantisation parameter. Sections making little contribution to the fidelity of a rendered viewport, such as those at the side or behind of the rendered view, may be compressed with a simpler block structure for reduced encoding effort and with less flexibility in control of the quantisation parameter. Generally, a larger value is chosen to more coarsely quantise transform coefficients for lower bitrate. Additionally, application of transform selection may be independent between the luma channel and the chroma channels, in order to further simplify the encoding process by avoiding the need to jointly consider luma and chroma for transform selection. In particular, the need to jointly consider luma and chroma for secondary transform selection is avoided after separately considering intra prediction mode for luma and chroma.

FIG. 1 is a schematic block diagram showing functional modules of a video encoding and decoding system 100. The system 100 can vary the area for which quantisation parameters are adjusted in different portions of the frame to accommodate different block partitioning constraints that may be in effect in the respective portions of the frame.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
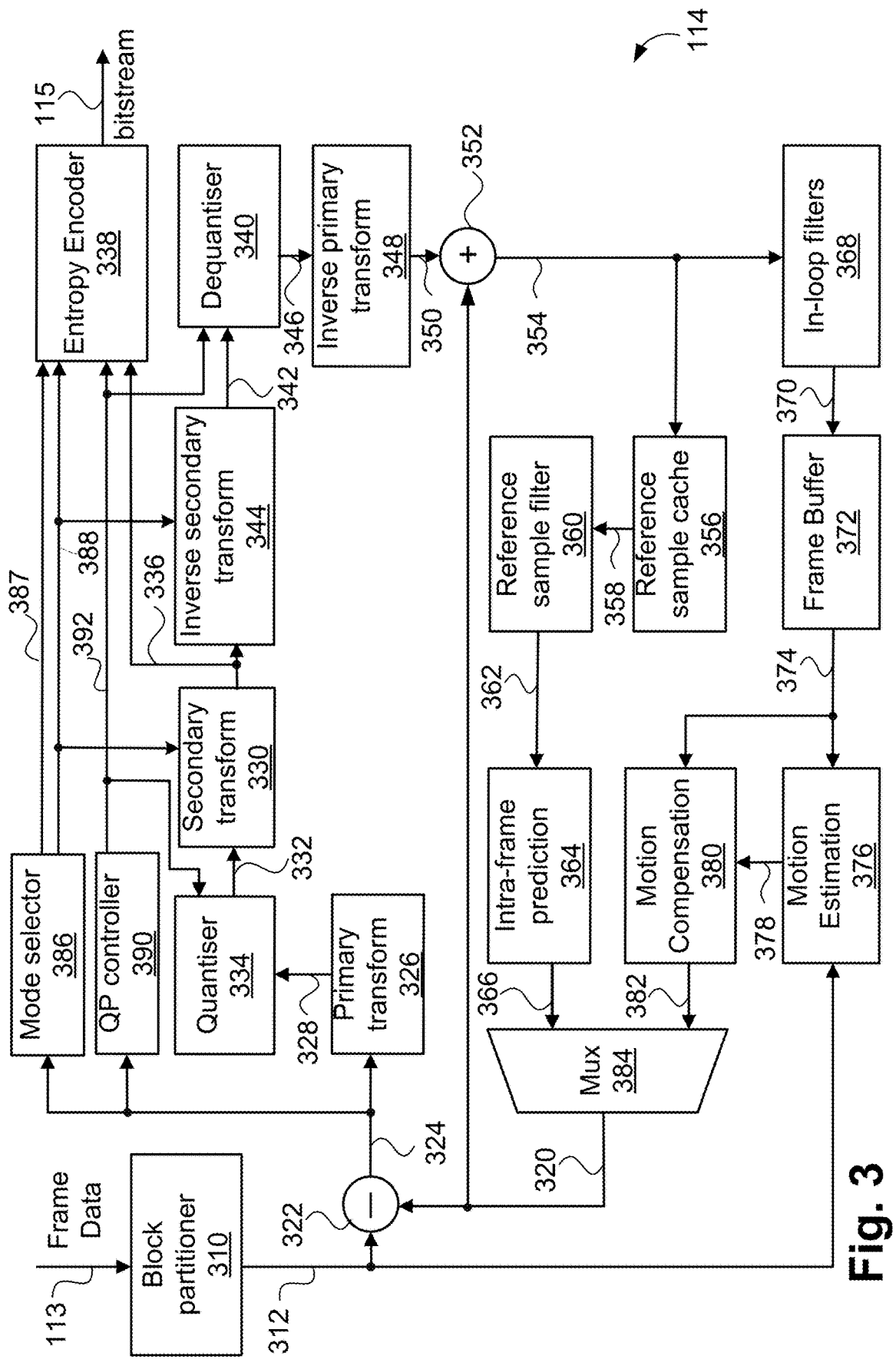
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120. For example, encoded video data may be served upon demand to customers over a wide area network (WAN) for a video streaming application.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers. Decoded frame data may be further transformed before presentation to a user. For example, a 'viewport' having a particular latitude and longitude may be rendered from decoded frame data using a projection format to represent a 360° view of a scene.

Figure 2A:
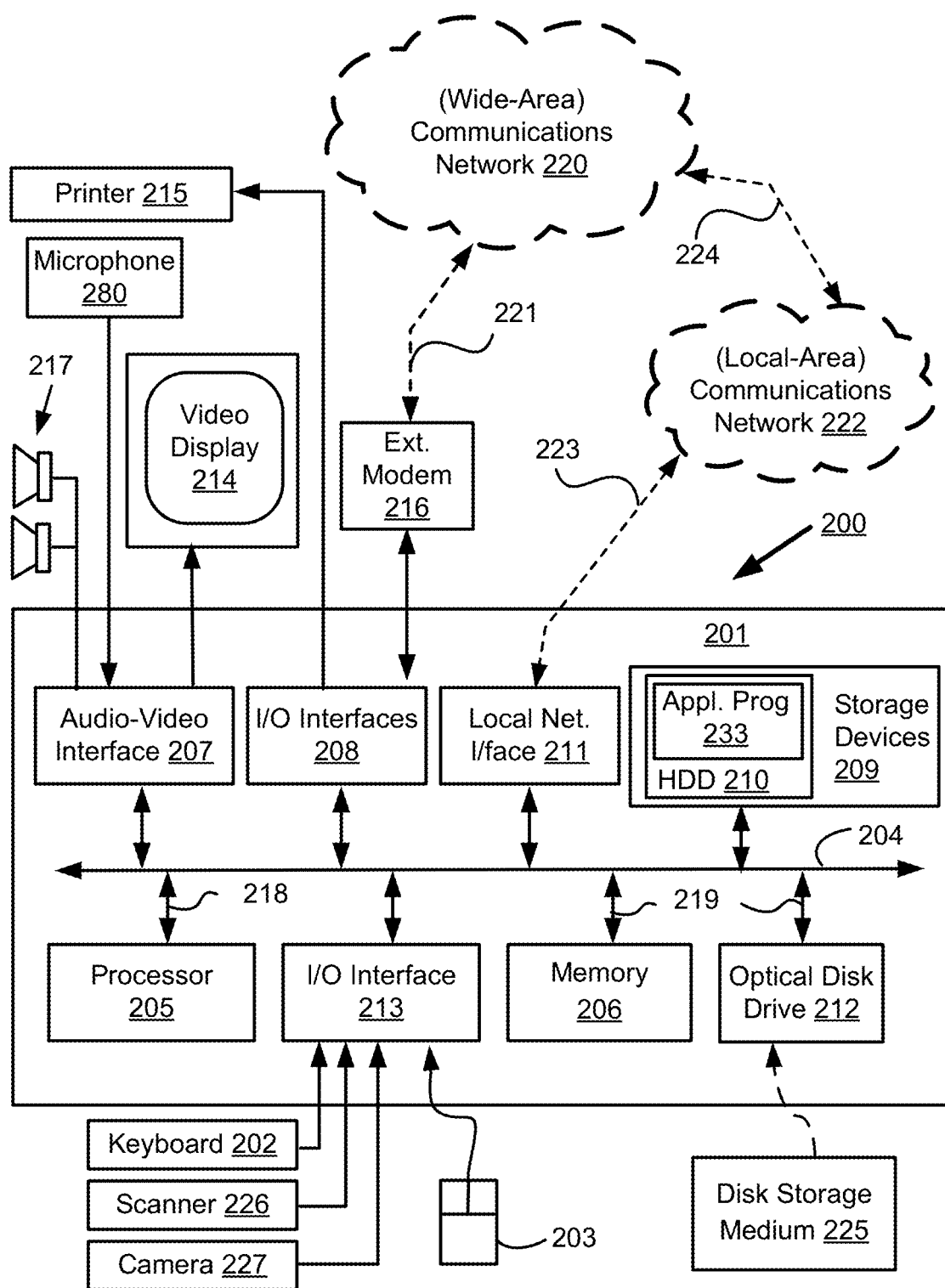
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
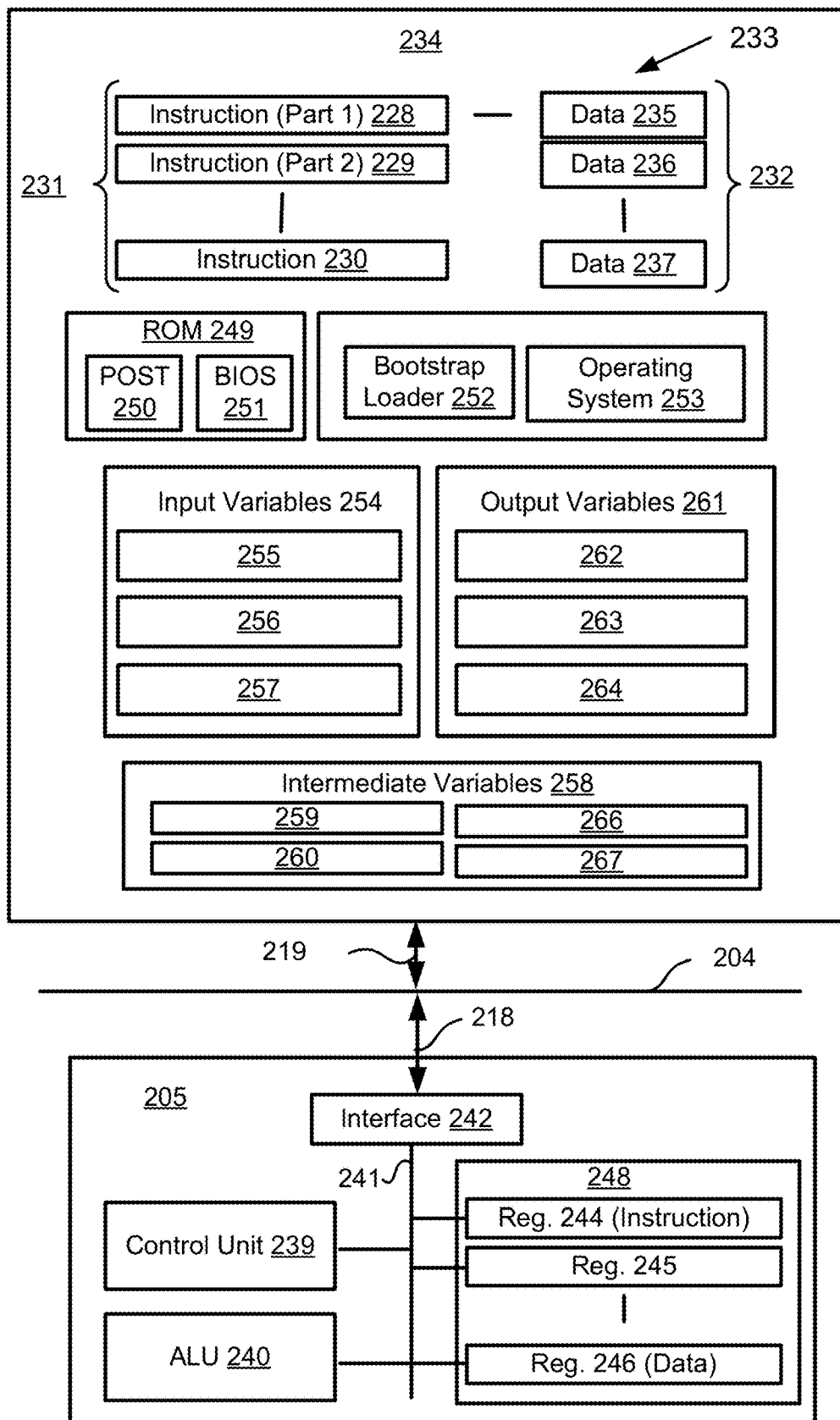

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method of FIGS. 13 to 18, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
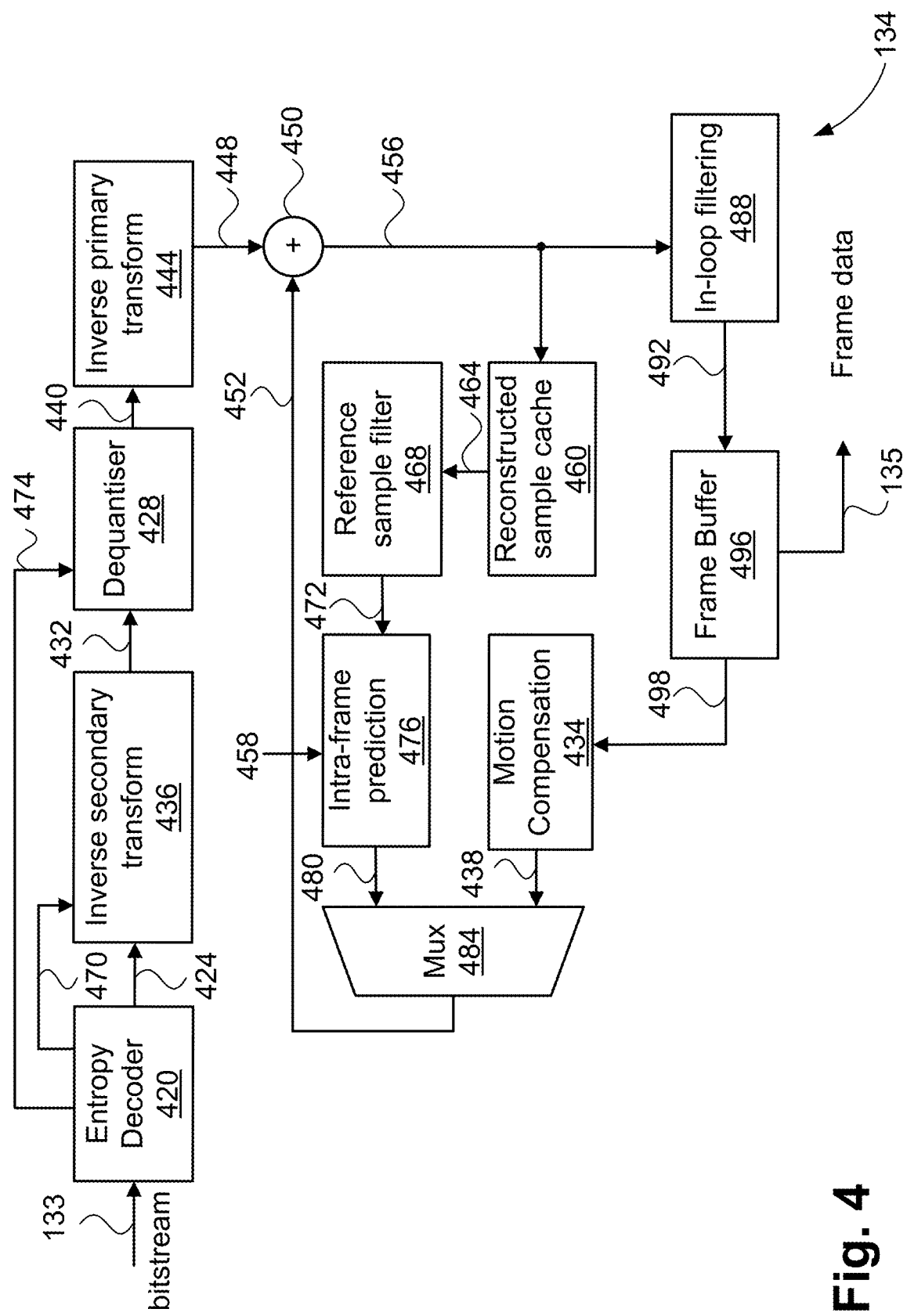
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-390 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in any chroma format, for example 4:0:0, 4:2:0, 4:2:2, or 4:4:4 chroma format. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CBs according to a luma coding tree and a chroma coding tree. The luma channel may also be referred to as a primary colour channel. Each chroma channel may also be referred to as a secondary colour channel. The CBs have a variety of sizes, and may include both square and non-square aspect ratios. Operation of the block partitioner 310 is further described with reference to FIGS. 13-15. However, in the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6. Although operation is generally described on a CTU-by-CTU basis, the video encoder 114 and the video decoder 134 can operate on a smaller-sized region to reduce memory consumption. For example, each CTU can be divided into smaller regions, known as 'virtual pipeline data units' (VPDUs) of size 64×64. The VPDUs form a granularity of data that is more amenable to pipeline processing in hardware architectures where the reduction in memory footprint reduces silicon area and hence cost, compared to operating on full CTUs.

The CTUs resulting from the first division of the frame data 113 may be scanned in raster scan order and may be grouped into one or more 'slices'. A slice may be an 'intra' (or 'I') slice. An intra slice (I slice) indicates that every CU in the slice is intra predicted. Alternatively, a slice may be uni-or bi-predicted ('P' or 'B' slice, respectively), indicating additional availability of uni- and bi-prediction in the slice, respectively.

In an I slice, the coding tree of each CTU may diverge below the 64×64 level into two separate coding trees, one for luma and another for chroma. Use of separate trees allows different block structure to exist between luma and chroma within a luma 64×64 area of a CTU. For example, a large chroma CB may be collocated with numerous smaller luma CBs and vice versa. In a P or B slice, a single coding tree of a CTU defines a block structure common to luma and chroma. The resulting blocks of the single tree may be intra predicted or inter predicted.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing relatively high compression efficiency with relatively low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the coding tree and the CBs themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The difference 324 is a block-size difference between corresponding samples in the PB 320 and the CB 312. The difference 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. When combined with the predicted PB in the video decoder 114, the TB 336 reduces the difference between a decoded CB and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The distortion of the CB is typically estimated as a difference in sample values, such as a sum of absolute differences (SAD) or a sum of squared differences (SSD). The estimate resulting from each candidate PB may be determined by a mode selector 386 using the difference 324 to determine a prediction mode 387. The prediction mode 387 indicates the decision to use a particular prediction mode for the current CB, for example intra-frame prediction or inter-frame prediction. Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense even in a real-time video encoder.

Determining an optimum mode in terms of rate-distortion is typically achieved using a variation of Lagrangian optimisation.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the 'best' mode. The lowest cost mode is the selected secondary transform index 388 and is also encoded in the bitstream 115 by an entropy encoder 338.

In the second stage of operation of the video encoder 114 (referred to as a 'coding' stage), an iteration over the determined coding tree(s) of each CTU is performed in the video encoder 114. For a CTU using separate trees, for each 64×64 luma region of the CTU, a luma coding tree is firstly encoded followed by a chroma coding tree. Within the luma coding tree only luma CBs are encoded and within the chroma coding tree only chroma CBs are encoded. For a CTU using a shared tree, a single tree describes the CUS, i.e., the luma CBs and the chroma CBs according to the common block structure of the shared tree.

The entropy encoder 338 supports both variable-length coding of syntax elements and arithmetic coding of syntax elements. Portions of the bitstream such as 'parameter sets', for example sequence parameter set (SPS) and picture parameter set (PPS) use a combination of fixed-length codewords and variable-length codewords. Slices (also referred to as contiguous portions) have a slice header that uses variable length coding followed by slice data, which uses arithmetic coding. The slice header defines parameters specific to the current slice, such as slice-level quantisation parameter offsets. The slice data includes the syntax elements of each CTU in the slice. Use of variable length coding and arithmetic coding requires sequential parsing within each portion of the bitstream. The portions may be delineated with a start code to form 'network abstraction layer units' or 'NAL units'. Arithmetic coding is supported using a context-adaptive binary arithmetic coding process. Arithmetically coded syntax elements consist of sequences of one or more 'bins'. Bins, like bits, have a value of '0' or '1'. However, bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol'

(MPS) is coded. Coding a most probable symbol is relatively inexpensive in terms of consumed bits in the bitstream 115, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin has a coding cost of one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes a quantisation parameter 392 and, if in use for the current CB, the LFNST index 388, using a combination of context-coded and bypass-coded bins. The quantisation parameter 392 is encoded using a 'delta QP'. The delta QP is signalled at most once in each area known as a 'quantisation group'. The quantisation parameter 392 is applied to residual coefficients of the luma CB. An adjusted quantisation parameter is applied to the residual coefficients of collocated chroma CBs. The adjusted quantisation parameter may include mapping from the luma quantisation parameter 392 according to a mapping table and a CU-level offset, selected from a list of offsets. The secondary transform index 388 is signalled when the residual associated with the transform block includes significant residual coefficients only in those coefficient positions subject to transforming into primary coefficients by application of a secondary transform.

A multiplexer module 384 outputs the PB 320 from an intra-frame prediction module 364 according to the determined best intra prediction mode, selected from the tested prediction mode of each candidate CB. The candidate prediction modes need not include every conceivable prediction mode supported by the video encoder 114. Intra prediction falls into three types. "DC intra prediction" involves populating a PB with a single value representing the average of nearby reconstructed samples. "Planar intra prediction" involves populating a PB with samples according to a plane, with a DC offset and a vertical and horizontal gradient being derived from the nearby reconstructed neighbouring samples. The nearby reconstructed samples typically include a row of reconstructed samples above the current PB, extending to the right of the PB to an extent and a column of reconstructed samples to the left of the current PB, extending downwards beyond the PB to an extent. "Angular intra prediction" involves populating a PB with reconstructed neighbouring samples filtered and propagated across the PB in a particular direction (or 'angle'). In VVC 65 angles are supported, with rectangular blocks able to utilise additional angles, not available to square blocks, to produce a total of 87 angles. A fourth type of intra prediction is available to chroma PBs, whereby the PB is generated from collocated luma reconstructed samples according to a 'cross-component linear model' (CCLM) mode. Three different CCLM modes are available, each mode using a different model derived from the neighbouring luma and chroma samples. The derived model is used to generate a block of samples for the chroma PB from the collocated luma samples.

Where previously reconstructed samples are unavailable, for example at the edge of the frame, a default half-tone value of one half the range of the samples is used. For example, for 10-bit video a value of 512 is used. As no previously samples are available for a CB located at the top-left position of a frame, angular and planar intra-prediction modes produce the same output as the DC prediction mode, i.e. a flat plane of samples having the half-tone value as magnitude.

For inter-frame prediction a prediction block 382 is produced using samples from one or two frames preceding the current frame in the coding order frames in the bitstream by a motion compensation module 380 and output as the PB 320 by the multiplexer module 384. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of pictures' structure, enabling a temporal hierarchy of frames. Frames may be divided into multiple slices, each of which encodes a portion of the frame. A temporal hierarchy of frames allows a frame to reference a preceding and a subsequent picture in the order of displaying the frames. The images are coded in the order necessary to ensure the dependencies for decoding each frame are met.

The samples are selected according to a motion vector 378 and reference picture index. The motion vector 378 and reference picture index applies to all colour channels and thus inter prediction is described primarily in terms of operation upon PUs rather than PBs, i.e. the decomposition of each CTU into one or more inter-predicted blocks is described with a single coding tree. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected the PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A forward primary transform module 326 applies a forward transform to the difference 324, converting the difference 324 from the spatial domain to the frequency domain, and producing primary transform coefficients represented by an arrow 328. The largest primary transform size in one dimension is either a 32-point DCT-2 or a 64-point DCT-2 transform. If the CB being encoded is larger than the largest supported primary transform size expressed as a block size, i.e. 64×64 or 32×32, the primary transform 326 is applied in a tiled manner to transform all samples of the difference 324. Application of the transform 326 results in multiple TBs for the CB. Where each application of the transform operates on a TB of the difference 324 larger than 32×32, e.g. 64×64, all resulting primary transform coefficients 328 outside of the upper-left 32×32 area of the TB are set to zero, i.e. discarded. The remaining primary transform coefficients 328 are passed to a quantiser module 334. The primary transform coefficients 328 are quantised according to a quantisation parameter 392 associated with the CB to produce primary transform coefficients 332. The quantisation parameter 392 may differ for a luma CB versus each chroma CB. The primary transform coefficients 332 are passed to a forward secondary transform module 330 to produce transform coefficients represented by an arrow 336 by performing a either a non-separable secondary transform (NSST) operation or bypassing the secondary transform. The forward primary transform is typically separable, transforming a set of rows and then a set of columns of each TB. The forward primary transform module 326 uses either a type-II discrete cosine transform (DCT-2) in the horizontal and vertical directions, or bypass of the transform horizontally and vertically, or combinations of a type-VII discrete sine transform (DST-7) and a type-VIII discrete cosine transform (DCT-8) in either horizontal or vertical directions for luma TBs not exceeding 16 samples in width and height. Use of combinations of a DST-7 and DCT-8 is referred to as 'multi transform selection set' (MTS) in the VVC standard.

The forward secondary transform of the module 330 is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 48 samples (arranged as three 4×4 sub-blocks in the upper-left 8×8 coefficients of the primary transform coefficients 328) to produce a set of secondary transform coefficients. The set of secondary transform coefficients may be fewer in number than the set of primary transform coefficients from which they are derived. Due to application of the secondary transform to only a set of coefficients adjacent to each other and including the DC coefficient, the secondary transform is referred to as a 'low frequency non-separable secondary transform' (LFNST). Moreover, when the LFNST is applied, all remaining coefficients in the TB must be zero, both in the primary transform domain and the secondary transform domain.

The quantisation parameter 392 is constant for a given TB and thus results in a uniform scaling for the production of residual coefficients in the primary transform domain for a TB. The quantisation parameter 392 may vary periodically with a signalled 'delta quantisation parameter'. The delta quantisation parameter (delta QP) is signalled once for CUs contained within a given area, referred to as a 'quantisation group'. If a CU is larger than the quantisation group size, delta QP is signalled once with one of the TBs of the CU. That is, the delta QP is signalled by the entropy encoder 338 once for the first quantisation group of the CU and not signalled for any subsequent quantisation groups of the CU. A non-uniform scaling is also possible by application of a 'quantisation matrix', whereby the scaling factor applied for each residual coefficient is derived from a combination of the quantisation parameter 392 and the corresponding entry in a scaling matrix. The scaling matrix can have a size that is smaller than the size of the TB, and when applied to the TB a nearest neighbour approach is used to provide scaling values for each residual coefficient from a scaling matrix smaller in size than the TB size. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. The scan within each sub-block and the progression from one sub-block to the next typically follow a backward diagonal scan pattern. Additionally, the quantisation parameter 392 is encoded into the bitstream 115 using a delta QP syntax element and the secondary transform index 388 is encoded in the bitstream 115 under conditions to be described with reference to FIGS. 13-15.

As described above, the video encoder 114 needs access to a frame representation corresponding to the decoded frame representation seen in the video decoder 134. Thus, the residual coefficients 336 are passed through an inverse secondary transform module 344, operating in accordance with the secondary transform index 388 to produce intermediate inverse transform coefficients, represented by an arrow 342. The intermediate inverse transform coefficients are inverse quantised by a dequantiser module 340 according to the quantisation parameter 392 to produce inverse transform coefficients, represented by an arrow 346. The intermediate inverse transform coefficients 346 are passed to an inverse primary transform module 348 to produce residual samples, represented by an arrow 350, of the TU. The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366.

For each candidate intra prediction mode the intra-frame prediction module 364 produces a block of samples, that is 366. The block of samples 366 is generated by the module 364 using techniques such as DC, planar or angular intra prediction.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and the motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity. When the video encoder 114 selects inter prediction for a CU the motion vector 378 is encoded into the bitstream 115.

Although the video encoder 114 of FIG. 3 is described with reference to versatile video coding (VVC), other video coding standards or implementations may also employ the processing stages of modules 310-390. The frame data 113 (and bitstream 115) may also be read from (or written to) memory 206, the hard disk drive 210, a CD-ROM, a Blu-ray disk™M or other computer readable storage medium. Additionally, the frame data 113 (and bitstream 115) may be received from (or transmitted to) an external source, such as a server connected to the communications network 220 or a radio-frequency receiver. The communications network 220 may provide limited bandwidth, necessitating the use of rate control in the video encoder 114 to avoid saturating the network at times when the frame data 113 is difficult to compress. Moreover, the bitstream 115 may be constructed from one or more slices, representing spatial sections (collections of CTUs) of the frame data 113, produced by one or more instances of the video encoder 114, operating in a co-ordinated manner under control of the processor 205. In the context of the present disclosure, a slice can also be referred to as a "contiguous portion" of the bitstream. Slices are contiguous within the bitstream and can be encoded or decoded as separate portions, for example if parallel processing is being used.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. The entropy decoder module 420 uses variable-length and fixed length decoding to decode SPS, PPS or slice header an arithmetic decoding engine to decode syntax elements of the slice data as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop, thus each slice may be decoded in its' entirety by a given entropy decoder 420 instance. A single (or few) high-performing entropy decoder 420 instances may decode all slices for a frame from the bitstream 115 multiple lower-performing entropy decoder 420 instances may concurrently decode the slices for a frame from the bitstream 133.

The entropy decoder module 420 applies an arithmetic coding algorithm, for example 'context adaptive binary arithmetic coding' (CABAC), to decode syntax elements from the bitstream 133. The decoded syntax elements are used to reconstruct parameters within the video decoder 134. Parameters include residual coefficients (represented by an arrow 424), a quantisation parameter 474, a secondary transform index 470, and mode selection information such as an intra prediction mode (represented by an arrow 458). The mode selection information also includes information such as motion vectors, and the partitioning of each CTU into one or more CBs. Parameters are used to generate PBs, typically in combination with sample data from previously decoded CBs.

The residual coefficients 424 are are passed to an inverse secondary transform module 436 where either a secondary transform is applied or no operation is performed (bypass) according to methods described with reference to FIGS. 16-18. The inverse secondary transform module 436 produces reconstructed transform coefficients 432, that is primary transform domain coefficients, from secondary transform domain coefficients. The reconstructed transform coefficients 432 are input to a dequantiser module 428. The dequantiser module 428 performs inverse quantisation (or 'scaling') on the residual coefficients 432, that is, in the primary transform coefficient domain, to create reconstructed intermediate transform coefficients, represented by an arrow 440, according to the quantisation parameter 474. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients 440.

The reconstructed transform coefficients 440 are passed to an inverse primary transform module 444. The module 444 transforms the coefficients 440 from the frequency domain back to the spatial domain. The result of operation of the module 444 is a block of residual samples, represented by an arrow 448. The block of residual samples 448 is equal in size to the corresponding CB. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420. The block of samples 480 is generated using modes such as DC, planar or angular intra prediction.

When the prediction mode of a CB is indicated to use intra prediction in the bitstream 133, the intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma CBs share the same intra prediction mode.

When the prediction mode of the CB is indicated to be inter prediction in the bitstream 133, a motion compensation module 434 produces a block of inter-predicted samples, represented as 438, using a motion vector (decoded from the bitstream 133 by the entropy decoder 420) and reference frame index to select and filter a block of samples 498 from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any of the DBF, the ALF and SAO filtering operations. Generally, the motion vector is applied to both the luma and chroma channels, although the filtering processes for sub-sample interpolation in the luma and chroma channel are different.

Figure 5:
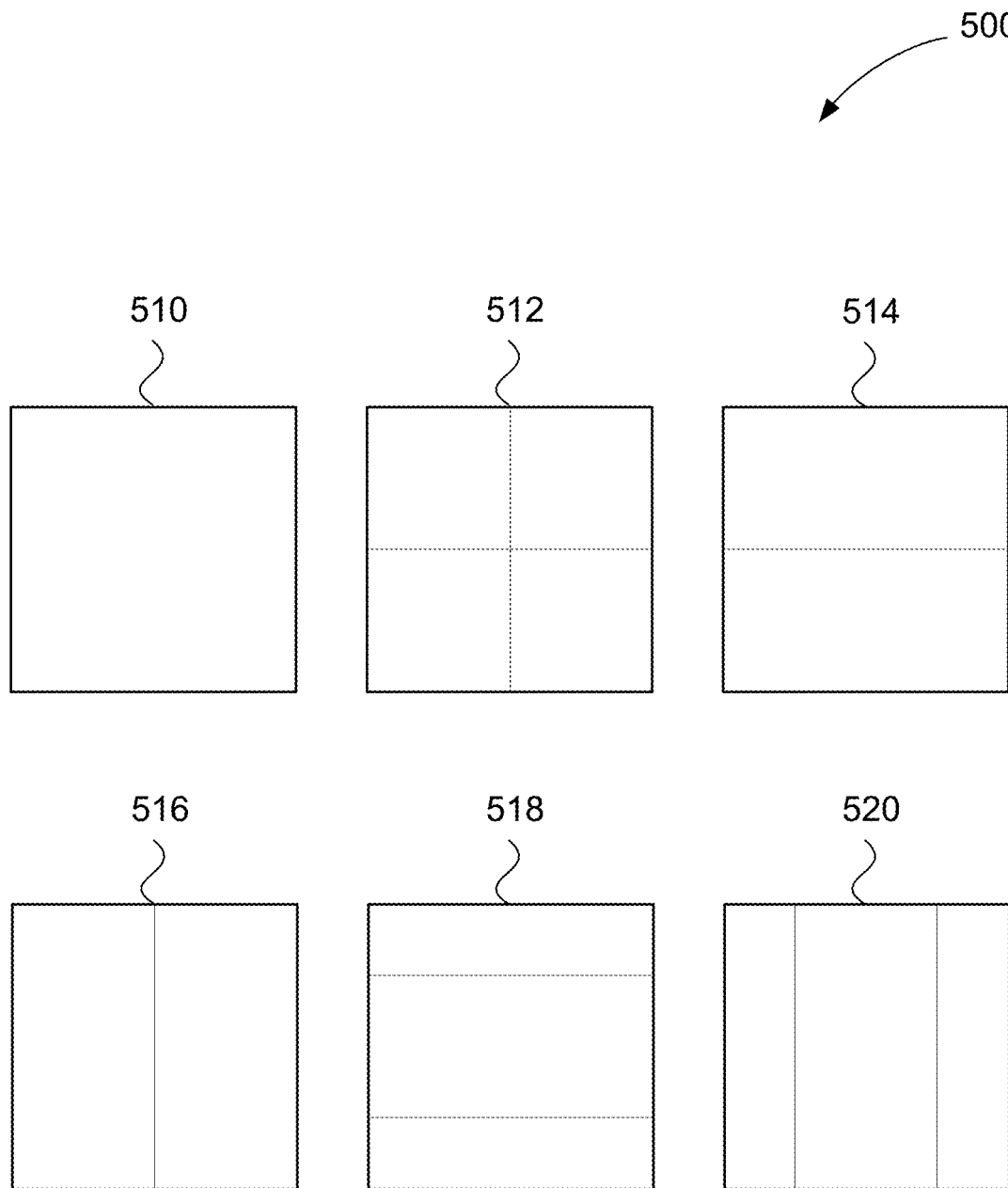
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the collection 500 is showing the potential divisions of a parent node in a coding tree into child nodes in the coding tree and not requiring the parent node to correspond to a square region. If the containing region is non-square, the dimensions of the blocks resulting from the division are scaled according to the aspect ratio of the containing block. Once a region is not further split, that is, at a leaf node of the coding tree, a CU occupies that region.

The process of subdividing regions into sub-regions must terminate when the resulting sub-regions reach a minimum CU size, generally 4×4 luma samples. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CUs larger than the minimum CU size. It is possible for no splitting to occur, resulting in a single CU occupying the entirety of the CTU. A single CU occupying the entirety of the CTU is the largest available coding unit size. Due to use of subsampled chroma formats, such as 4:2:0, arrangements of the video encoder 114 and the video decoder 134 may terminate splitting of regions in the chroma channels earlier than in the luma channels, including in the case of a shared coding tree defining the block structure of the luma and chroma channels. When separate coding trees are used for luma and chroma, constraints on available splitting operations ensure a minimum chroma CB area of 16 samples, even though such CBs are collocated with a larger luma area, e.g., 64 luma samples.

At the leaf nodes of the coding tree exist CUs, with no further subdivision. For example, a leaf node 510 contains one CU. At the non-leaf nodes of the coding tree exist a split into two or more further nodes, each of which could be a leaf node that forms one CU, or a non-leaf node containing further splits into smaller regions. At each leaf node of the coding tree, one coding block exists for each colour channel. Splitting terminating at the same depth for both luma and chroma results in three collocated CBs. Splitting terminating at a deeper depth for luma than for chroma results in a plurality of luma CBs being collocated with the CBs of the chroma channels.

A quad-tree split 512 divides the containing region into four equal-size regions as shown in FIG. 5. Compared to HEVC, versatile video coding (VVC) achieves additional flexibility with additional splits, including a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. When only quad-tree splitting is available, each increase in coding tree depth corresponds to a reduction in CU size to one quarter the size of the parent area. In VVC, the availability of binary and ternary splits means that the coding tree depth no longer corresponds directly to CU area. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
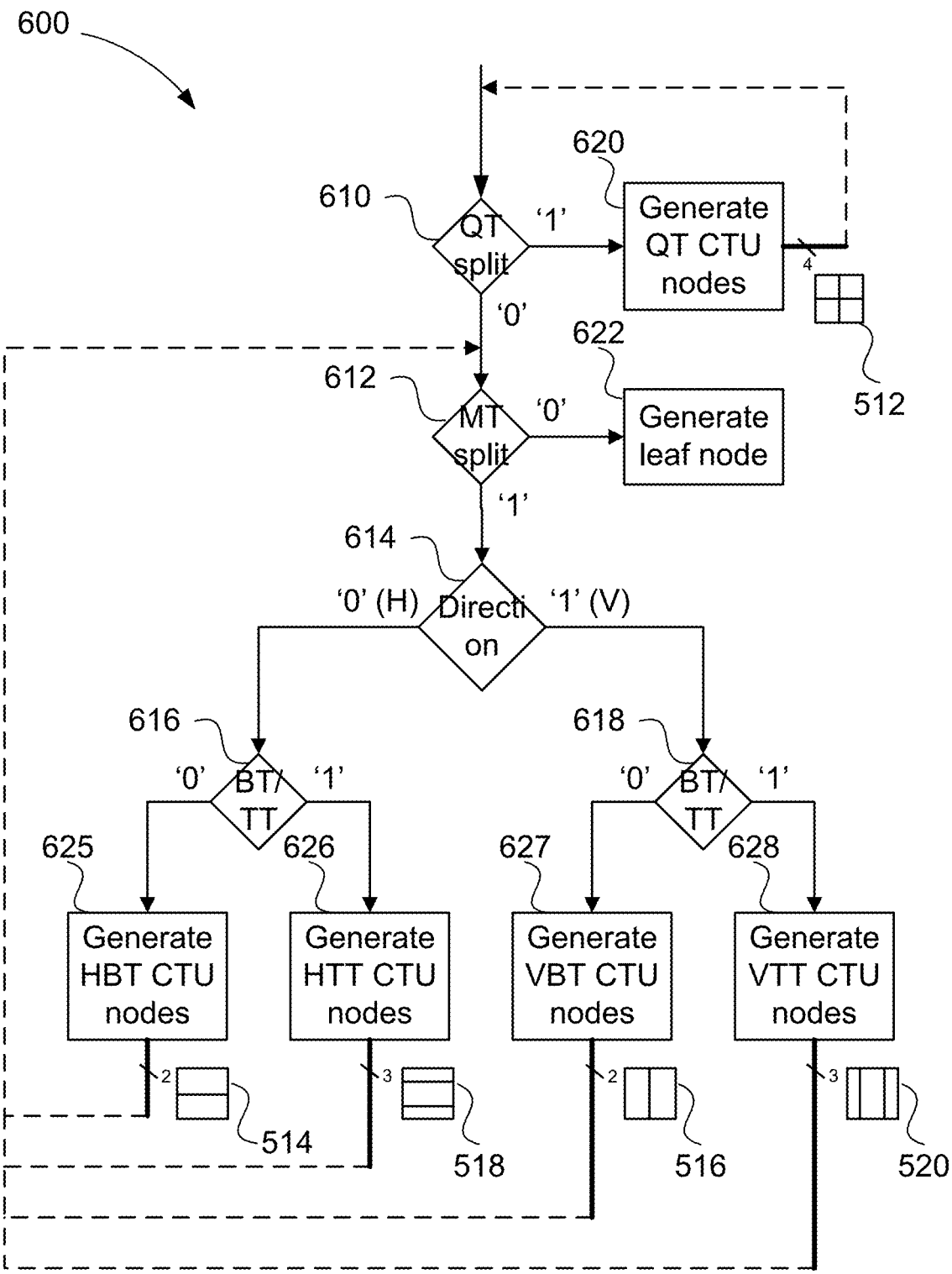
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
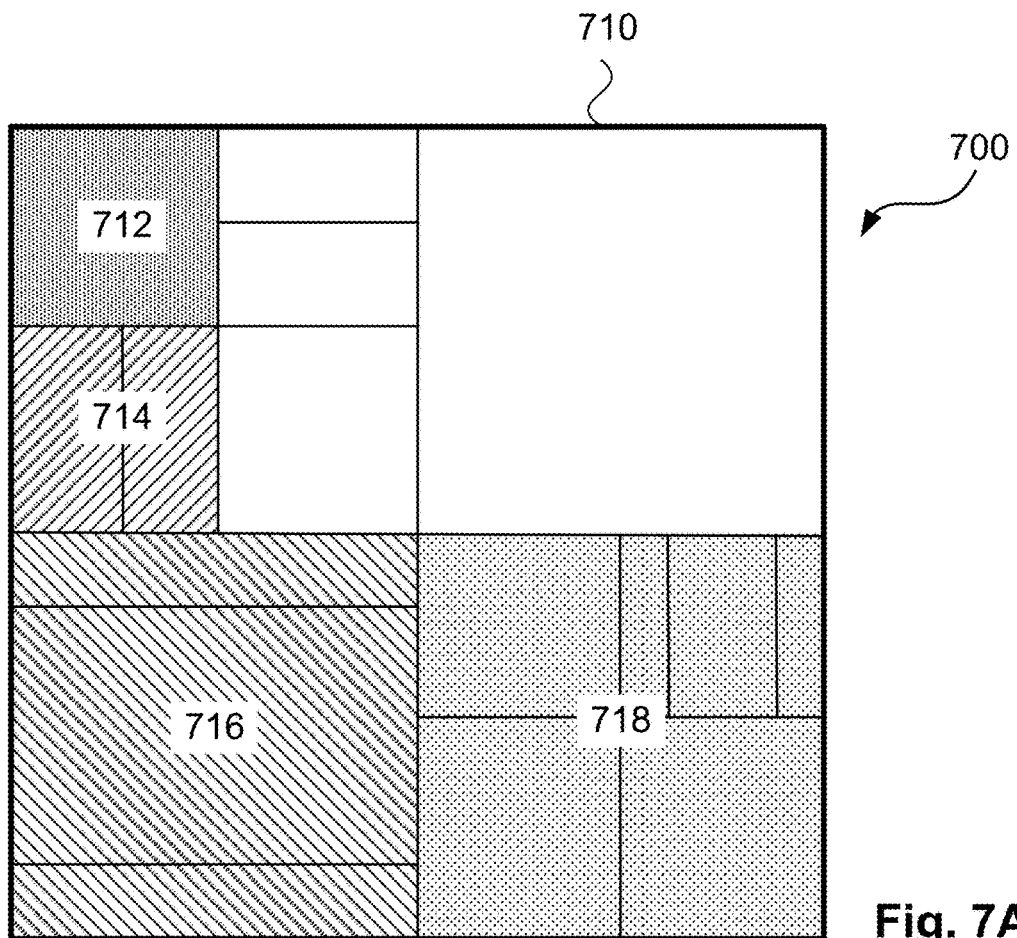
FIGS. 7A and 7B show an example division of a coding tree unit (CTU) into a number of coding units (CUs)
Figure 7B:
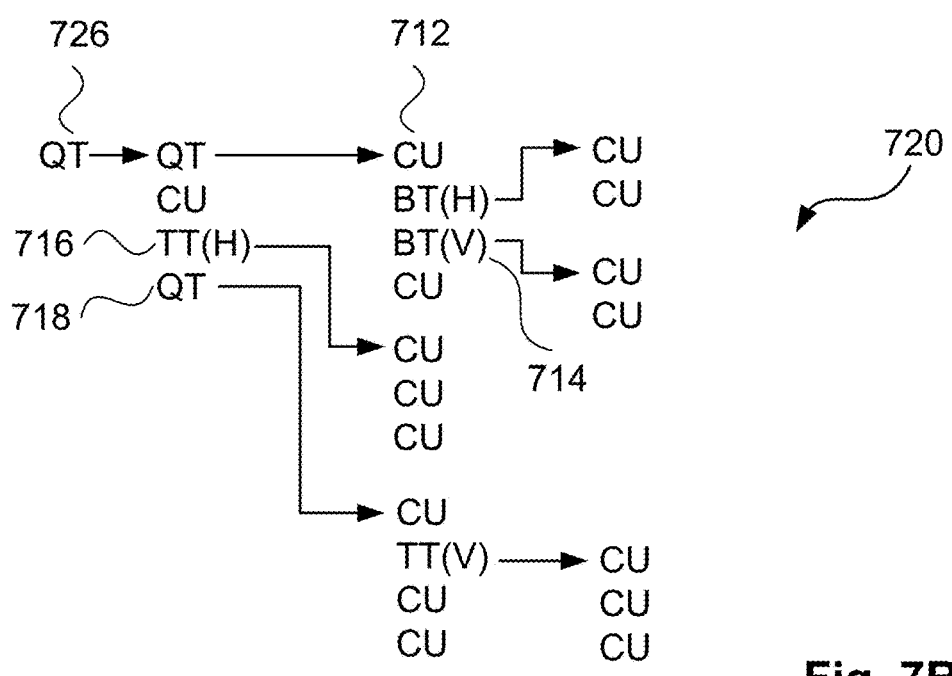

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

Figure 8A:
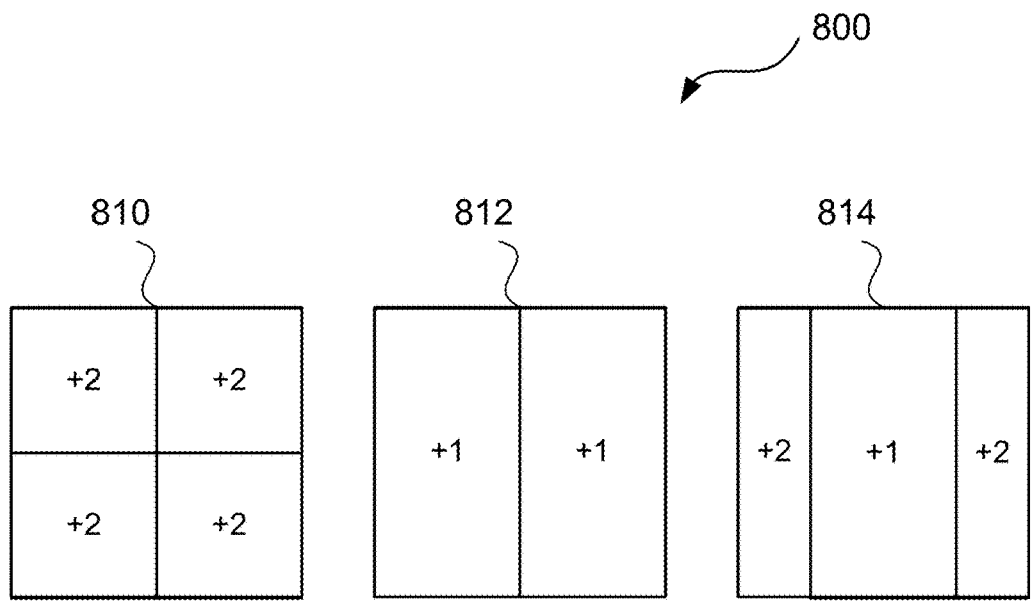
FIGS. 8A, 8B, and 8C show subdivision levels resulting from splits in a coding tree and their effect on a division of a coding tree unit into quantisation groups.
Figure 8B:
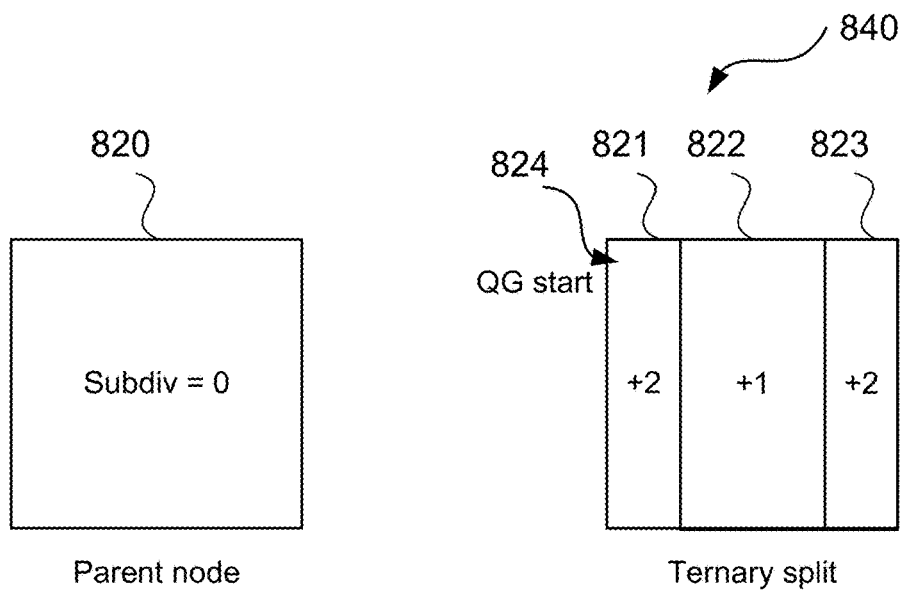
Figure 8C:
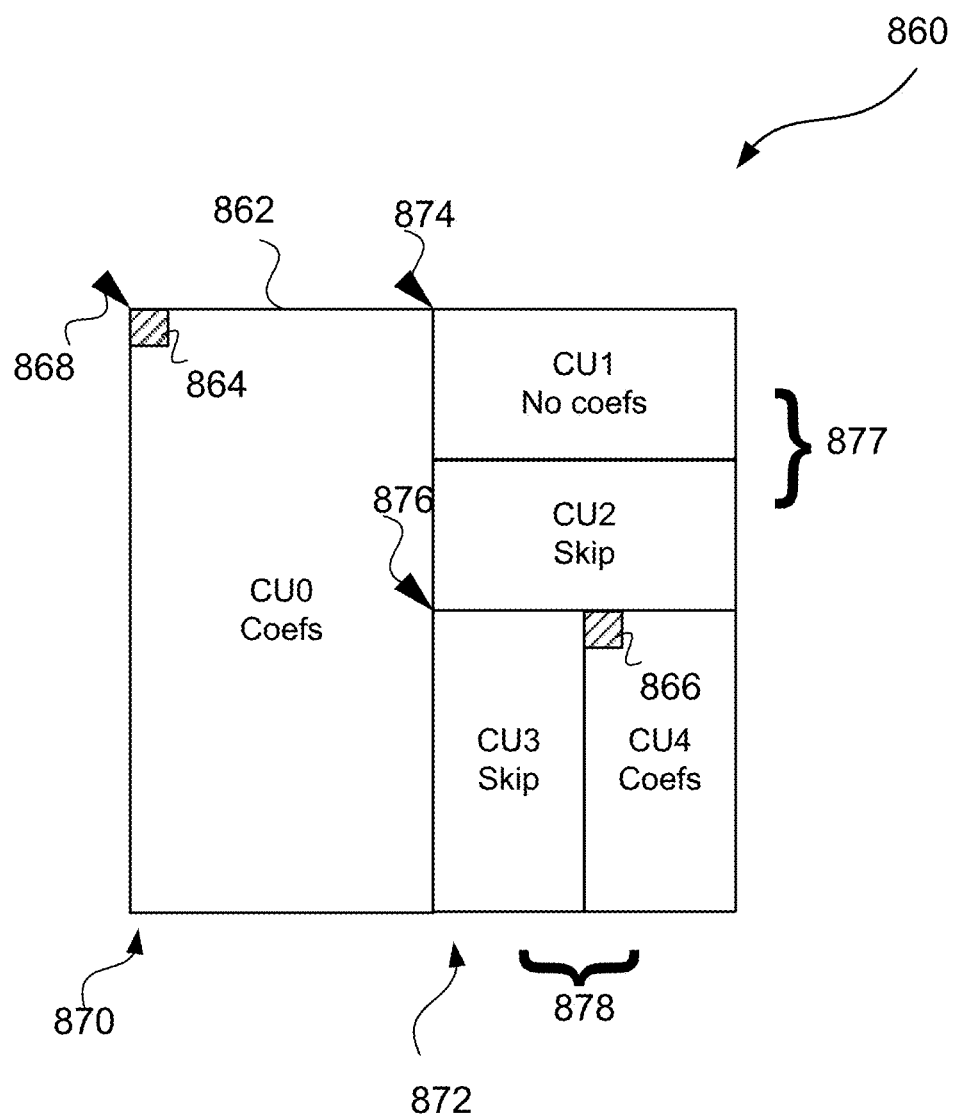

FIGS. 8A, 8B, and 8C show subdivision levels resulting from splits in a coding tree and the corresponding effect on a division of a coding tree unit into quantisation groups. Delta QP (392) is signalled with the residual of a TB at most once per quantisation group. In HEVC, the definition of quantisation group corresponds with coding tree depth, as the definition results in areas of a fixed size. In VVC, the additional splits mean that coding tree depth is no longer a suitable proxy for CTU area. In VVC a 'subdivision level' is defined, with each increment corresponding to a halving of the contained area.

FIG. 8A shows a collection 800 of splits in a coding tree and the corresponding subdivision levels. At the root node of the coding tree the subdivision level is initialised to zero. When a coding tree includes a quadtree split, e.g. 810, the subdivision level is incremented by two for any CUs contained therein. When a coding tree includes a binary split, e.g. 812, the subdivision level is incremented by one for any CUs contained therein. When a coding tree includes a ternary split, e.g. 814, the subdivision level is incremented by two for the outer two CUs and by one for the inner CU resulting from the ternary split. As the coding tree of each CTU is traversed, as described with reference to FIG. 6, a subdivision level of each resulting CU is determined according to the collection 800.

FIG. 8B shows an example set 840 of CU nodes and illustrates the effect of splits. An example parent node 820 of the set 840 with subdivision level of zero corresponds to a CTU, of size 64×64 in the example of FIG. 8B. The parent node 820 is ternary split to produce three child nodes, 821, 822 and 823 of sizes 16×64, 32×64, and 16×64 respectively. the child nodes 821, 822 and 823 have subdivision levels of 2, 1 and 2, respectively.

In the example of FIG. 8B the quantisation group threshold is set to 1, corresponding to a halving of the 64×64 area, i.e. to an area of 2048 samples. A flag tracks the starting of new QGs. The flag tracking new QGs is reset for any node with a subdivision level less than or equal to the quantisation group threshold. The flag is set when traversing the parent node 820 having a subdivision level of zero. Although the centre CU 822 of size 32×64 has an area of 2048 samples, the two sibling CUs 821 and 823 have subdivision levels of two, i.e. areas of 1024 and so the flag is not reset when traversing the centre CU and the quantisation group does not start at the centre CU. Instead, the flag begins at the parent node, shown at 824, as per the initial flag reset. Effectively, the QP may change only on boundaries aligned to multiples of the quantisation group area. Delta QP is signalled along with the residual of a TB associated with a CB. If no significant coefficients are present then there is no opportunity to code a delta QP.

FIG. 8C shows an example 860 of division of a CTU 862 into multiple CUs and QGs to illustrate the relationship between subdivision level, QG, and signalling of delta QP. A vertical binary split divides the CTU 862 into two halves, a left half 870 containing one CU CU0 and a right half 872 containing several CUs (CU1-CU4). The quantisation group threshold is set to two in the example of FIG. 8C, resulting in quantisation groups normally having an area equal to one quarter the area of the CTU. As the parent node, i.e., the root node of the coding tree, has a subdivision level of zero, the QG flag is reset and a new QG will begin with the next coded CU, i.e. the CU at arrow 868. CU0 (870) has coded coefficients and so a delta QP 864 is coded along with the residual of CU0. The right half 872 is subject to a horizontal binary split and further splitting in the upper and lower sections of the right half 872, resulting in CU1-CU4. The coding tree nodes corresponding to the upper (877 including CU1 and CU2) and lower (878 including CU3 and CU4) sections of the right half 872 have a subdivision level of two. The subdivision level of 2 is equal to the quantisation group threshold of two and so new QGs commence at each section, marked as 874 and 876 respectively. CU1 has no coded coefficients (no residual) and CU2 is a 'skipped' CU, which also has no coded coefficients. Therefore no delta QP is coded for the upper section. CU3 is a skipped CU and CU4 has a coded residual, and so a delta QP 866 is coded with the residual of CU4 for the QG including CU3 and CU4.

Figure 9A:
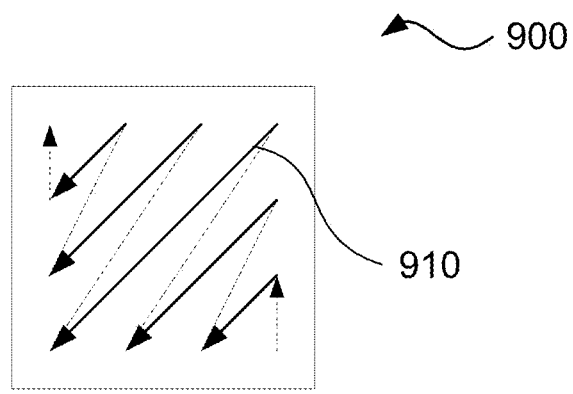
FIGS. 9A and 9B show a 4×4 transform block scan pattern and associated primary and secondary transform coefficients.
Figure 9B:
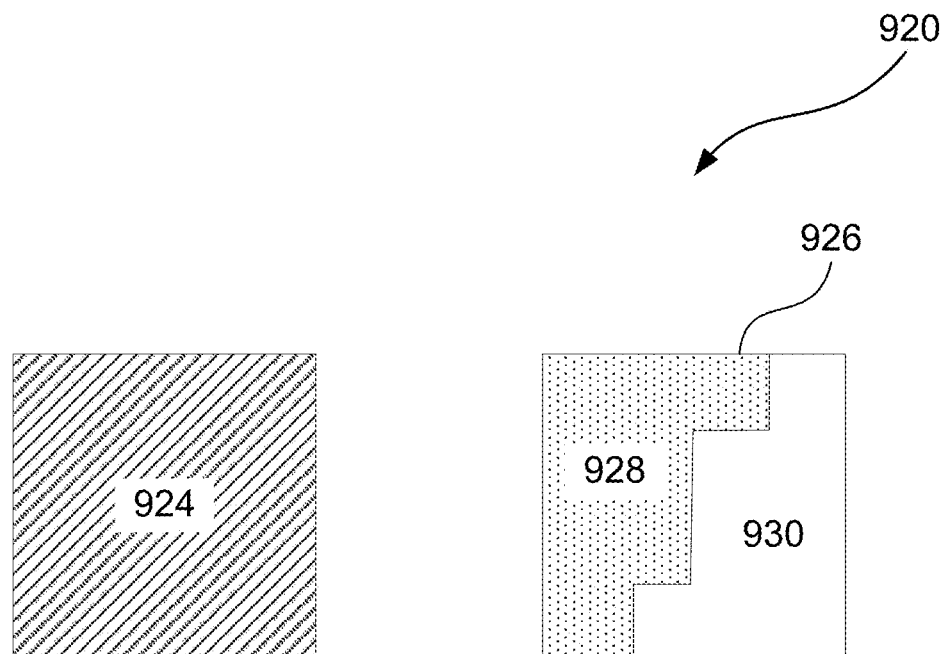

FIGS. 9A and 9B show a 4×4 transform block scan pattern and associated primary and secondary transform coefficients. Operation of the secondary transform module 330 upon primary residual coefficients is described in terms of the video encoder 114. A 4×4 TB 900 is scanned according to a backward diagonal scan pattern 910. The scan pattern 910 proceeds from a 'last significant coefficient' position back towards the DC (top-left) coefficient position. All coefficients positions that are not scanned, for example when considering scanning in a forward direction, residual coefficients located after the last significant coefficient position, are implicitly non-significant. When a secondary transform is used all remaining coefficients are non-significant. That is, all secondary domain residual coefficients not subject to secondary transformation are non-significant and all primary domain residual coefficients not populated by application of the secondary transform are required to be non-significant. Moreover, after application of the forward secondary transform by the module 330, there may be fewer secondary-transformed coefficients than the number of primary-transformed coefficients that were processed by the secondary transform module 330. For example, FIG. 9B shows a set 920 of blocks. In FIG. 9B, sixteen (16) primary coefficients are arranged as one 4×4 sub-block, being 924 of the 4×4 TB 920. The primary residual coefficients may be subject to secondary transformation to produce a secondary transformed block 926 in the example of FIG. 9B. The secondary transformed block 926 contains eight secondary transformed coefficients 928. The eight secondary transformed coefficients 928 are stored in the TB according to the scan pattern 910, packed from the DC coefficient position onwards. The remaining coefficient positions of the 4×4 sub-block, shown as an area 930, contain quantised residual coefficients from the primary transform and are required to all be non-significant for the secondary transform to be applied. Thus, a last significant coefficient position of a 4×4 TB specifying a coefficient that is one of the first eight scan positions of the TB 920 indicates either (i) application of a secondary transform, or (ii) the output of the primary transform, after quantisation, having no significant coefficients beyond the eighth scan position of the TB 920.

When it is possible to perform a secondary transform on a TB, a secondary transform index, i.e. 388, is encoded to indicate the possible application of the secondary transform. The secondary transform index can also indicate, where multiple transform kernels are available, which kernel is to be applied as the secondary transform at the module 330. Correspondingly, the video decoder 134 decodes the secondary transform index 470 when the last significant coefficient position is located in any one of the scan positions reserved for holding secondary transformed coefficients, e.g. 928.

Although a secondary transform kernel mapping 16 primary coefficients to eight secondary coefficients has been described, different kernels are possible, including kernels mapping to a different number of secondary transformed coefficients. The number of secondary transformed coefficients may be the same as the number of primary transformed coefficients, for example 16. For TBs of width four and height greater than four, the behaviour described with respect to the 4×4 TB case applies to the top sub-block of the TB. Other sub-blocks of the TB have zero-valued residual coefficients when the secondary transform is applied. For TBs of width greater than four and height equal to four the behaviour described with respect to the 4×4 TB case applies to the leftmost sub-block of the TB, and other sub-blocks of the TB have zero-valued residual coefficients, allowing the last significant coefficient position to be used to determine whether the secondary transform index needs to be decoded or not.

Figure 9C:
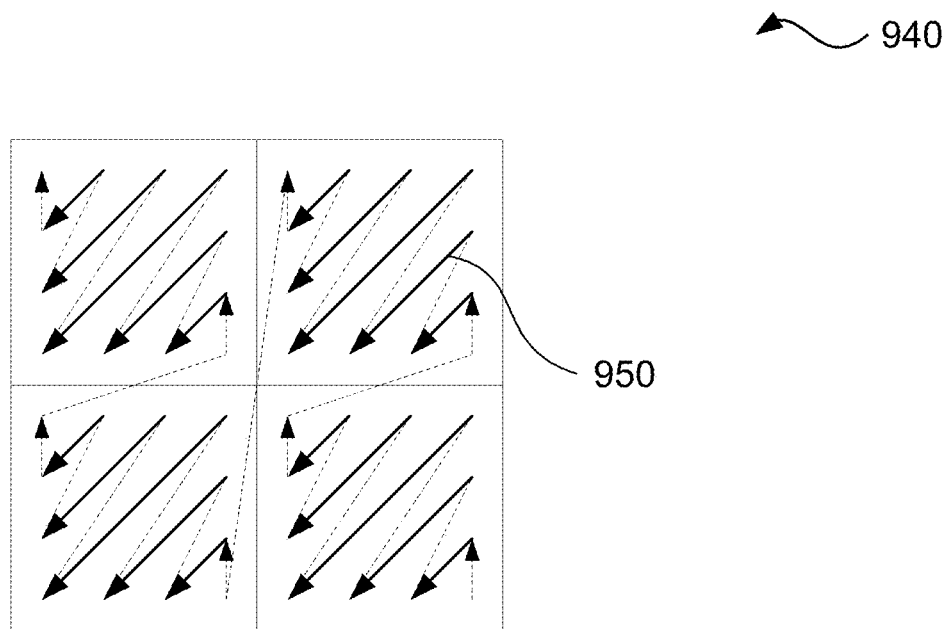
FIGS. 9C and 9D show an 8×8 transform block scan pattern and associated primary and secondary transform coefficients.
Figure 9D:
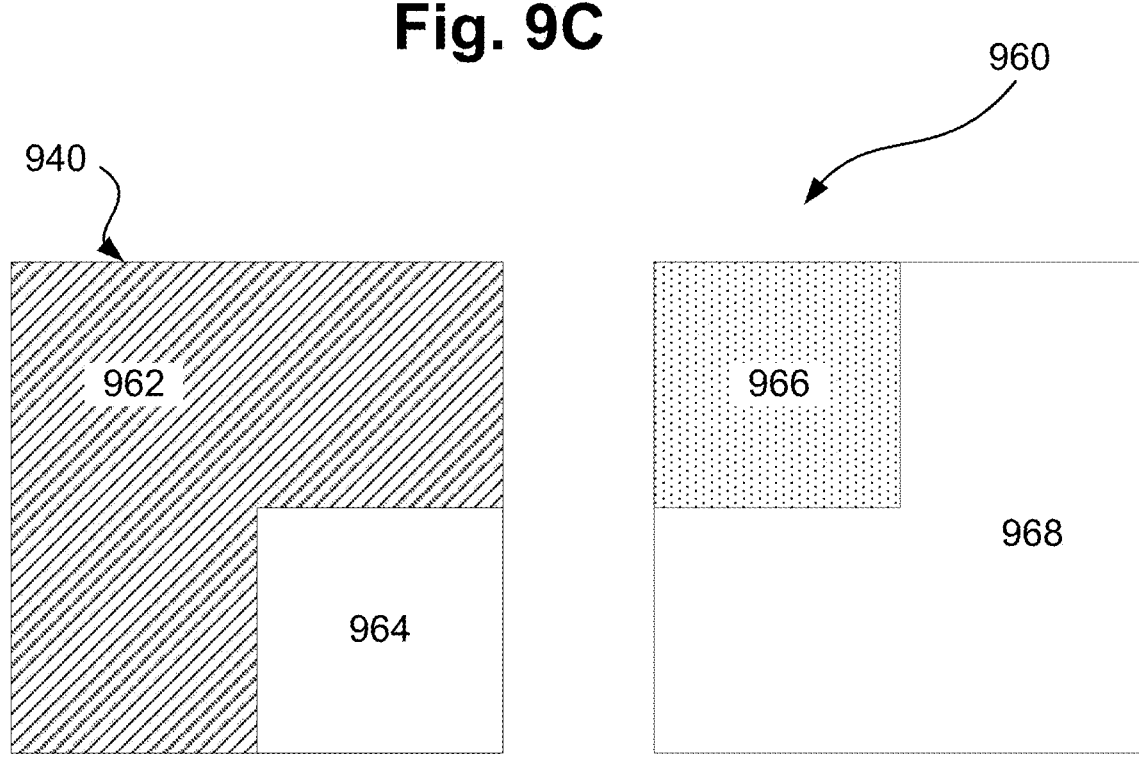

FIGS. 9C and 9D show an 8×8 transform block scan pattern and example associated primary and secondary transform coefficients. FIG. 9C shows a 4×4 sub-block-based backward diagonal scan pattern 950 for an 8×8 TB 940. The 8×8 TB 940 is scanned in the 4×4 sub-block-based backward diagonal scan pattern 950. FIG. 9D shows a set 960 showing effect of operation of the secondary transform. The scan 950 proceeds from a last significant coefficient position back to the DC (top-left) coefficient position. Application of a forward secondary transform kernel to 48 primary coefficients, shown as an area 962 of 940, is possible when the remaining 16 primary coefficients, shown as 964, are zero-valued. The application of the secondary transform to the area 962 results in 16 secondary transformed coefficients shown as 966. The other coefficient positions of the TB are zero valued, marked as 968. If the last significant position of the 8×8 TB 940 indicates a secondary transformed coefficient is within 966, the secondary transform index, 388, is encoded to indicate the application of a particular transform kernel (or bypassing the kernel) by the module 330. The video decoder 134 uses the last significant position of a TB to determine whether or not to decode a secondary transform index, that is the index 470. For transform blocks with width or height exceeding eight samples, the approach of FIGS. 9C and 9D is applied in the upper-left 8×8 region, that is to the upper left 2×2 sub-blocks of the TB.

As described in FIGS. 9A-9D, two sizes of secondary transform kernels are available. One size of secondary transform kernel is for transform blocks with width or height of four and the other size secondary transform is for transform blocks with width and height greater than four. Within each size of kernel, multiple sets (e.g. four) of secondary transform kernel are available. One set is selected based on the intra prediction mode for the block, which may differ between a luma block and a chroma block. Within the selected set, either one or two kernels are available. The use of one kernel within a selected set or the bypassing of the secondary transform is signalled via the secondary transform index, independently for luma blocks and chroma blocks in a coding unit belonging to a shared tree of a coding tree unit. In other words, the index used for the luma channel and the index used for the chroma channel(s) are independent of one another.

Figure 10:
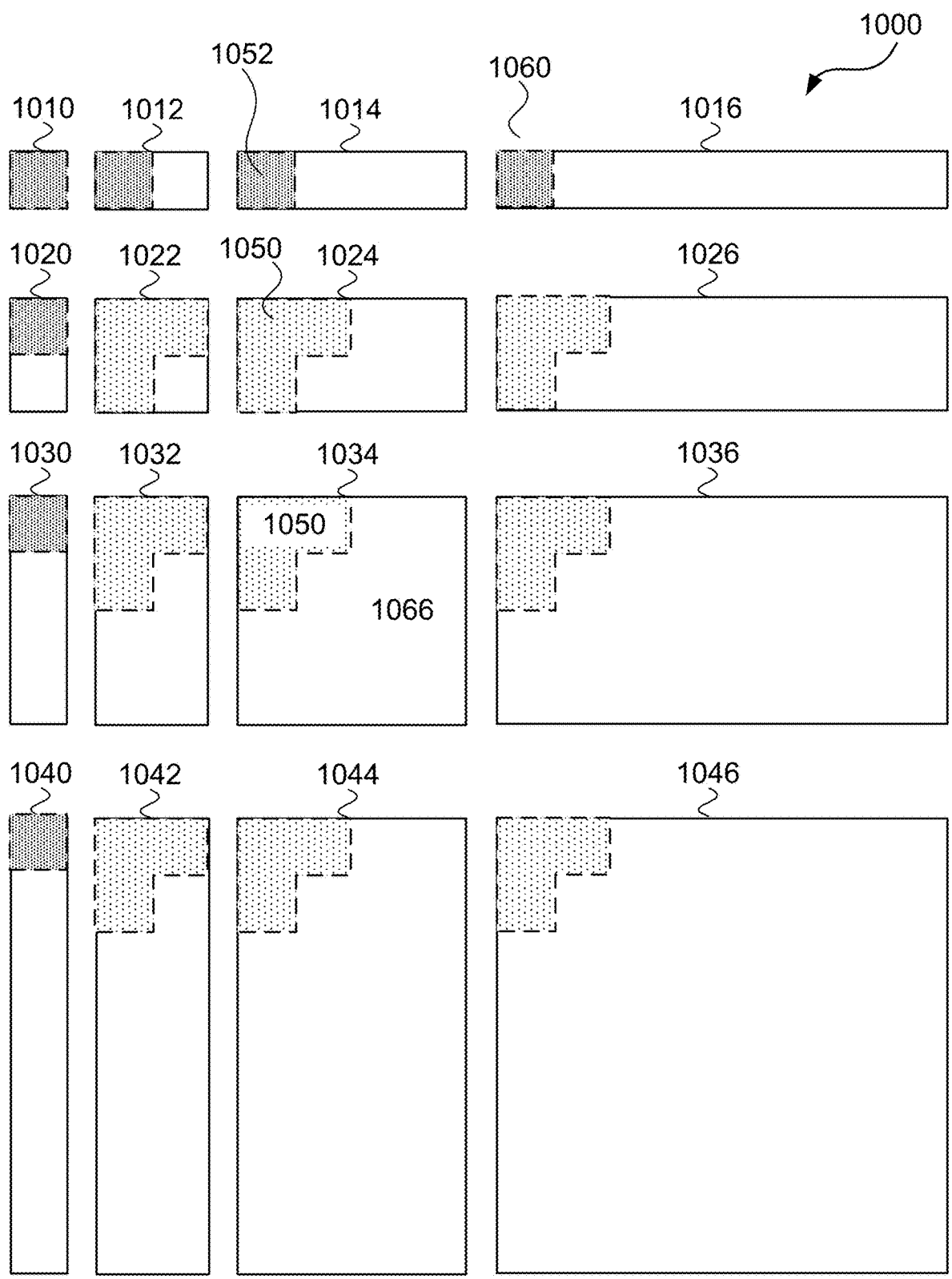
FIG. 10 shows regions of application of the secondary transform for transform blocks of various sizes.

FIG. 10 shows a set 1000 of transform blocks available in the versatile video coding (VVC) standard. FIG. 10 also shows the application of the secondary transform to a subset of residual coefficients from transform blocks of the set 1000. FIG. 10 shows TBs with widths and heights ranging from four to 32. However TBs of width and/or height 64 are possible but are not shown for ease of reference.

A 16-point secondary transform 1052 (shown with darker shading) is applied to a 4×4 set of coefficients. The 16-point secondary transform 1052 is applied to TBs with a width or a height of four, e.g., a 4×4 TB 1010, an 8×4 TB 1012, a 16×4 TB 1014, a 32×4 TB 1016, a 4×8 TB 1020, a 4×16 TB 1030, and a 4×32 TB 1040. If a 64-point primary transform is available, the 16-point secondary transform 1052 is applied to TBs of size 4×64 and a 64×4 (not shown in FIG. 10). For TBs with a width or height of four but with more than 16 primary coefficients, the 16-point secondary transform is applied only to the upper-left 4×4 sub-block of the TB and other sub-blocks are required to have zero-valued coefficients in order for the secondary transform to be applied. Generally application of a 16-point secondary transform results in 16 secondary transform coefficients, which are packed into the TB for encoding into the sub-block from which the original 16 primary transform coefficients were obtained. A secondary transform kernel may result in the creation of fewer secondary transform coefficients than the number of primary transform coefficients upon which the secondary transform was applied, for example as described with reference to FIG. 9B.

For transform sizes with a width and height greater than four, a 48-point secondary transform 1050 (shown with lighter shading) is available for application to three 4×4 sub-blocks of residual coefficients in the upper-left 8×8 region of the transform block, as shown in FIG. 10. The 48-point secondary transform 1050 is applied to an 8×8 transform block 1022, a 16×8 transform block 1024, a 32×8 transform block 1026, an 8×16 transform block 1032, a 16×16 transform block 1034, a 32×16 transform block 1036, an 8×32 transform block 1042, a 16×32 transform block 1044, and a 32×32 transform block 1046, in each case in the region shown with light shading and a dashed outline. If a 64-point primary transform is available, the 48-point secondary transform 1050 is also applicable to TBs of size 8×64, 16×64, 32×64, 64×64, 64×32, 64×16 and 64×8 (not shown). Application of a 48-point secondary transform kernel generally results in the production of fewer than 48 secondary transform coefficients. For example, 8 or 16 secondary transform coefficients may be produced. The secondary transform coefficients are stored in the transform block in the upper-left region, for example, eight secondary transform coefficients are shown in FIG. 9D. Primary transform coefficients not subject to the secondary transform ('primary-only coefficients'), for example coefficients 1066 (similarly to 964 of FIG. 9D) of the TB 1034, are required to be zero-valued in order for the secondary transform to be applied. After application of the 48-point secondary transform 1050 in a forward direction, the region which may contain significant coefficients is reduced from 48 coefficients to 16 coefficients, further reducing the number of coefficient positions which may contain significant coefficients. For example, 968 will contain only non-significant coefficients. For the inverse secondary transform, decoded significant coefficients present, e.g. only in 966 of a TB, are transformed to produce coefficients any of which may be significant in a region, e.g. 962, which are then subject to the primary inverse transform. Only the upper-left 4×4 sub-block may contain significant coefficients when a secondary transform reduces one or more sub-blocks to a set of 16 secondary transform coefficients. A last significant coefficient position located at any coefficient position for which secondary transform coefficients may be stored indicates either application of a secondary transform or only a primary transform was applied. However, after quantisation, the resulting significant coefficients are in the same region as if a secondary transform kernel had been applied.

When the last significant coefficient position indicates a secondary transform coefficient position in a TB (e.g. 922 or 962), a signalled secondary transform index is needed to distinguish between applying a secondary transform kernel or bypassing the secondary transform. Although application of secondary transforms to TBs of various sizes in FIG. 10 has been described from the perspective of the video encoder 114, a corresponding inverse process is performed in the video decoder 134. The video decoder 134 firstly decodes a last significant coefficient position. If the decoded last significant coefficient position indicates potential application of a secondary transform, that is the position is within 928 or 966 for secondary transform kernels that produce 8 or 16 secondary transform coefficients respectively, a secondary transform index is decoded to determine whether to apply or bypass the inverse secondary transform.

Figure 11:
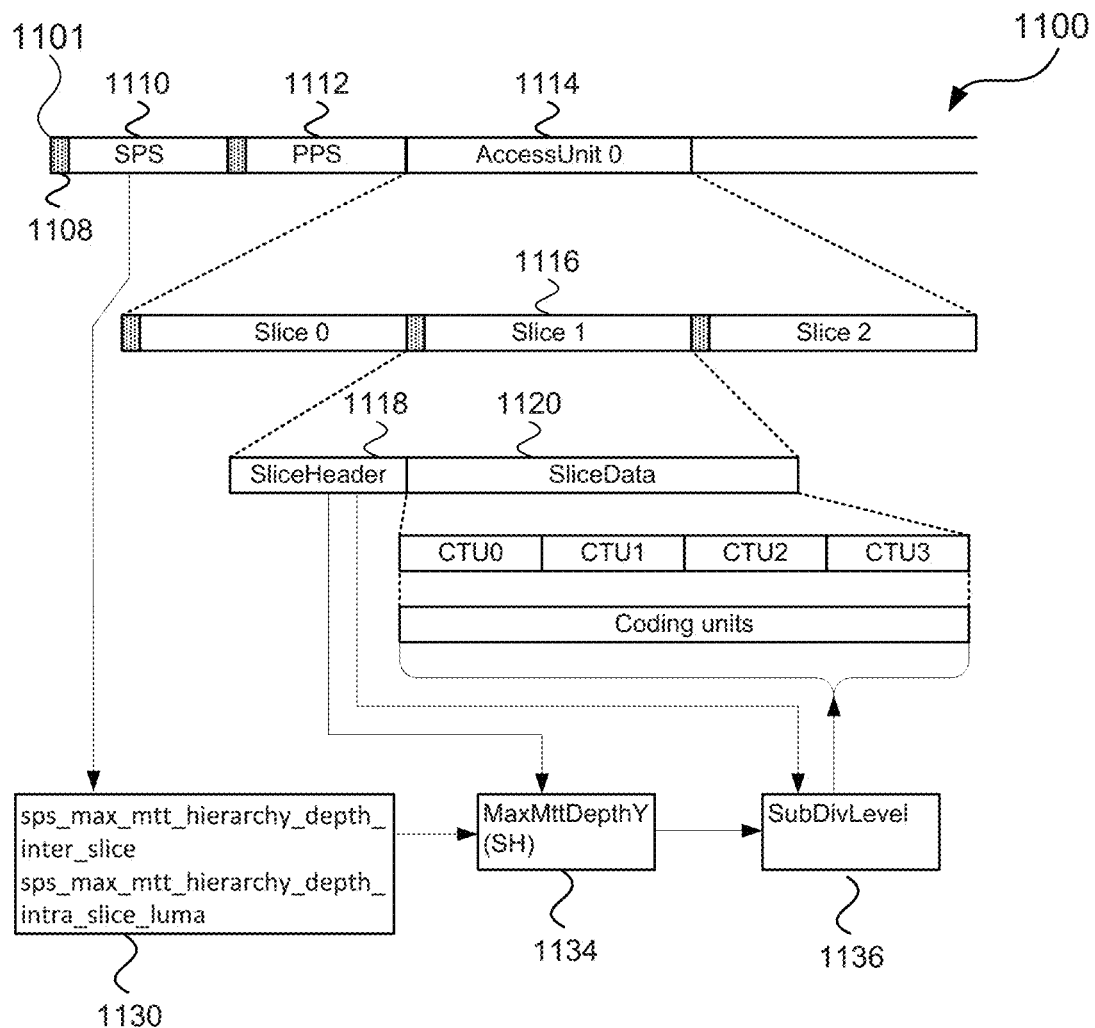
FIG. 11 shows a syntax structure for a bitstream with multiple slices, each of which includes multiple coding units.

FIG. 11 shows a syntax structure 1100 for a bitstream 1101 with multiple slices. Each of the slices includes multiple coding units. The bitstream 1101 may be produced by the video encoder 114, e.g. as the bitstream 115, or may be parsed by the video decoder 134, e.g. as the bitstream 133. The bitstream 1101 is divided into portions, for example network abstraction layer (NAL) units, with delineation achieved by preceding each NAL unit with a NAL unit header such as 1108. A sequence parameter set (SPS) 1110 defines sequence-level parameters, such as a profile (set of tools) used for encoding and decoding the bitstream, chroma format, sample bit depth, and frame resolution. Parameters are also included in the set 1110 that constrain the application of different types of split in the coding tree of each CTU. Coding of parameters that constrain the type of split may be optimised for more compact representation, for example, using log2 basis for block size constraints and expressing the parameters relative to other parameters such as minimum CTU size. Several parameters that are coded in the SPS 1110 are as follows:

log2_ctu_size_minus5: specifies the CTU size, with coded values 0, 1, and 2 specifying a CTU size of 32×32, 64×64, and 128×128, respectively.

partition_constraints_override_enabled_flag: enables the ability to apply a slice-level override of several parameters, collectively known as partition constraint parameters 1130.

log2_min_luma_coding_block_size_minus2: specifies the minimum coding block size (in luma samples), with values 0, 1, 2, . . . specifying minimum luma CB sizes of 4×4, 8×8, 16×16, . . . . The maximum coded value is constrained by the specified CTU size, i.e. such that log2_min_luma_coding_block_size_minus2≤log2_ctu_size_minus5 +3. Available chroma block dimensions correspond to available luma block dimensions, scaled according to chroma channel subsampling of the chroma format in use.

sps_max_mtt_hierarchy_depth_inter_slice: specifies the maximum hierarchy depth of coding units in the coding tree for multi-tree type splitting (i.e. binary and ternary splitting) relative to a quadtree node in the coding tree (i.e. once quadtree splitting ceases in the coding tree) for inter (P or B) slices and is one of the parameters 1130.

sps_max_mtt_hierarchy_depth_intra_slice_luma: specifies the maximum hierarchy depth of coding units in the coding tree for multi-tree type splitting (i.e. binary and ternary) relative to a quadtree node in the coding tree (i.e. once quadtree splitting ceases in the coding tree) for intra (I) slices and is one of the parameters 1130.

partition_constraints_override_flag: the parameter is signalled in the slice header when partition_constraints_override_enabled_flag in the SPS is equal to one and indicates that the partition constraints as signalled in the SPS are to be overridden for the corresponding slice.

A picture parameter set (PPS) 1112 defines sets of parameters applicable to zero or more frames. Parameters included in the PPS 1112 include parameters dividing frames into one or more "tiles" and/or "bricks". Parameters of the PPS 1112 may also include a list of CU chroma QP offsets, one of which may be applied at the CU level to derive a quantisation parameter for use by chroma blocks from the quantisation parameter of a collocated luma CB.

A sequence of slices forming one picture is known as an access unit (AU), such as AU 0 1114. The AU 0 1114 includes three slices, such as slices 0 to 2. Slice 1 is marked as 1116. As with other slices, slice 1 (1116) includes a slice header 1118 and slice data 1120.

The slice header includes parameters grouped as 1134. The group 1134 includes:

slice_max_mtt_hierarchy_depth_luma: signalled in the slice header 1118 when partition_constraints_override_flag in the slice header is equal to one and overrides the value derived from the SPS. For an I slice, instead of using sps_max_mtt_hierarchy_depth_intra_slice_luma to set a MaxMttDepth at 1134, slice_max_mtt_hierarchy_depth_luma is used. For a P or B slice, instead of using sps_max_mtt_hierarchy_depth_inter_slice, slice_max_mtt_hierarchy_depth_luma is used.

A variable MinQtLog2SizeIntraY (not shown) is derived from a syntax element sps_log2_diff_min_qt_min_cb_intra_slice_luma, decoded from the SPS 1110, specifies the minimum coding block size resulting from zero or more quadtree splits (i.e. with no further MTT splits occurring in the coding tree) for I slices. A variable MinQtLog2SizeInterY (not shown) is derived from a syntax element sps_log2_diff_min_qt_min_cb_inter_slice, decoded from the SPS 1110. The variable MinQtLog2SizeInterY specifies the minimum coding block size resulting from zero or more quadtree splits (i.e. with no futher MTT splits occurring in the coding trec) for P and B slices. As CUs resulting from quadtree splits are square, the variables MinQtLog2SizeIntraY and MinQtLog2SizeInterY each specify both the width and the height (as a log2 of the CU width/height).

A parameter cu_qp_delta_subdiv can be optionally signalled in the slice header 1118 and indicates the maximum subdivision level at which delta QP is signalled in a coding tree for shared trees or luma branches in a separate tree slice. For I slices, the range of cu_qp_delta_subdiv is 0 to 2*(log2_ctu_size_minus5+5−MinQtLog2SizeIntraY+MaxMttDepthY 1134. For P or B slices, the range of cu_qp_delta_subdiv is 0 to 2*(log2_ctu_size_minus5+5−MinQtLog2SizeInterY+MaxMttDepthY 1134. As the range of cu_qp_delta_subdiv is dependent on the value MaxMtt- DepthY 1134 derived from partition constraints either obtained from the SPS 1110 or the slice header 1118, there is no parsing issue.

A parameter cu_chroma_qp_offset_subdiv can be optionally signalled in the slice header 1118 and indicates the maximum subdivision level at which chroma CU QP offsets are signalled, either in a shared tree or in chroma branches in a separate tree slice. The range constraints on cu_chroma_qp_offset_subdiv for I or P/B slices is the same as the corresponding range constraints on cu_qp_delta_subdiv.

A subdivision level 1136 is derived for the CTUs in the slice 1120, designated cu_qp_delta_subdiv for luma CBs and cu_chroma_qp_offset_subdiv for chroma CBs. The subdivision level is used to establish at which points in the CTU delta QP syntax elements are coded, as described with reference to FIGS. 8A-C. For chroma CBs, a chroma CU level offset enable (and index, if enabled) are signalled, also using the approach of FIGS. 8A-C.

Figure 12:
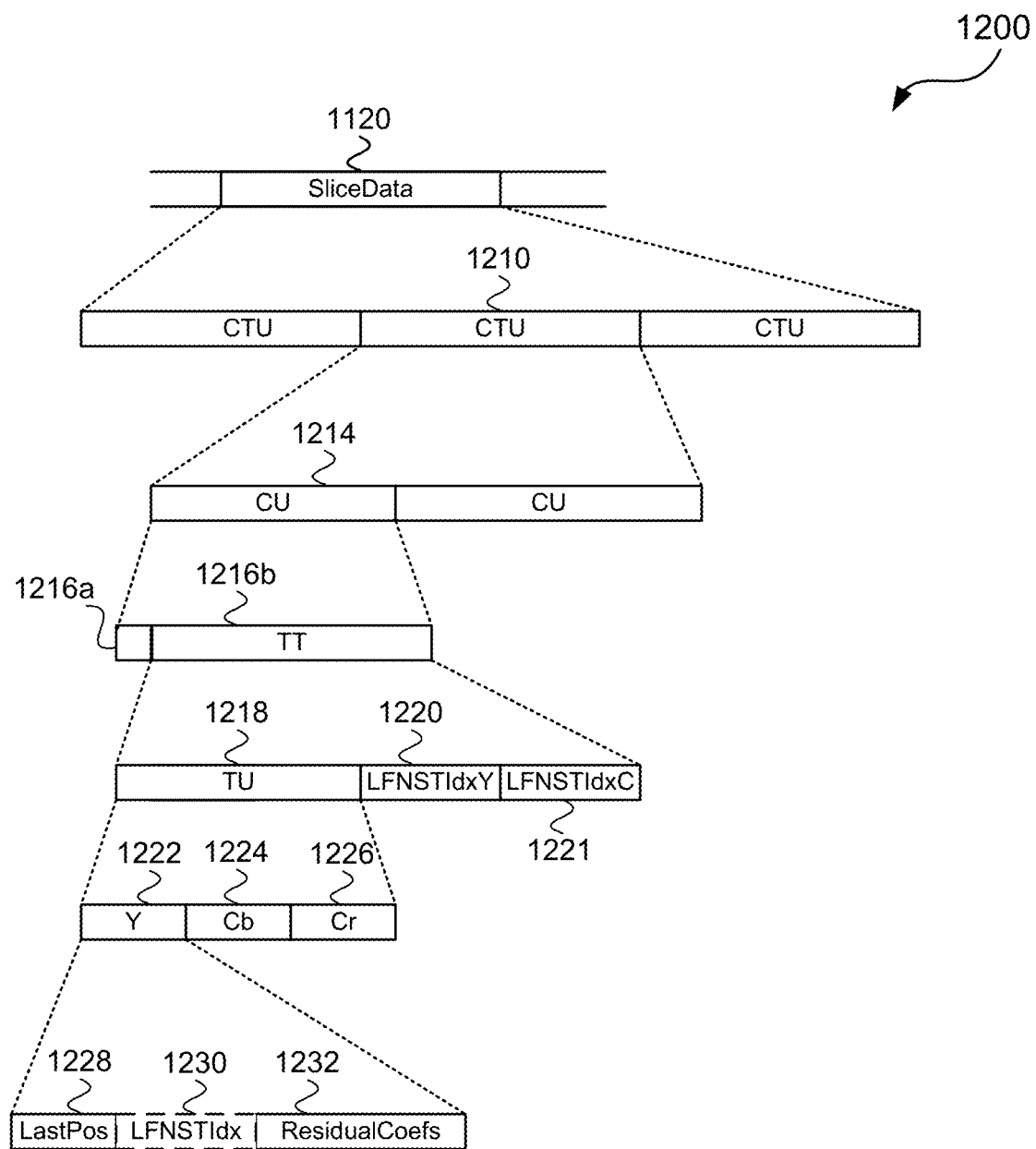
FIG. 12 shows a syntax structure for a bitstream with a shared tree for luma and chroma coding blocks of a coding tree unit.

FIG. 12 shows a syntax structure 1200 for the slice data 1120 of the bitstream 1101 (e.g. 115 or 133) with a shared tree for luma and chroma coding blocks of a coding tree unit, such as a CTU 1210. The CTU 1210 includes one or more CUs, an example shown as a CU 1214. The CU 1214 includes a signalled prediction mode 1216a followed by a transform tree 1216b. When the size of the CU 1214 does not exceed the maximum transform size (either 32×32 or 64×64) then the transform tree 1216b includes one transform unit, shown as a TU 1218.

If the prediction mode 1216a indicates usage of intra prediction for the CU 1214, a luma intra prediction mode and a chroma intra prediction mode are specified. For the luma CB of the CU 1214, the primary transform type is also signalled as either (i) DCT-2 horizontally and vertically, (ii) transform skip horizontally and vertically, or (iii) combinations of DST-7 and DCT-8 horizontally and vertically. If the signalled luma transform type is DCT-2 horizontally and vertically (option (i)), an additional luma secondary transform type 1220, also known as a 'low frequency non-separable transform' (LFNST) index, is signalled in the bitstream, under conditions as described with reference to FIGS. 9A-D. A chroma secondary transform type 1221 is also signalled. The chroma secondary transform type 1221 is signalled independently of whether the luma primary transform type is DCT-2 or not.

Use of a shared coding tree results in the TU 1218 including TBs for each colour channel, shown as a luma TB Y 1222, a first chroma TB Cb 1224, and a second chroma TB Cr 1226. A coding mode in which a single chroma TB is sent to specify the chroma residual both for Cb and Cr channels is available, known as a 'joint CbCr' coding mode. When the joint CbCr coding mode is enabled, a single chroma TB is encoded.

Irrespective of colour channel, each TB includes a last position 1228. The last position 1228 indicates the last significant residual coefficient position in the TB when considering coefficients in the diagonal scan pattern, used to serialise the array of coefficients of a TB, in a forward direction (i.e. from the DC coefficient onwards). If the last position 1228 of a TB indicates that only coefficients in the secondary transform domain are significant, that is all remaining coefficients that would only be subject to primary tramsformation, the secondary transform index is signalled to specify whether or not to apply a secondary transform.

If a secondary transform is to be applied and if more than one secondary transform kernel is available, the secondary transform index indicates which kernel is selected. Generally, either one kernel is available or two kernels are available in a 'candidate set'. The candidate set is determined from the intra prediction mode of the block. Generally, there are four candidate sets, although there may be fewer candidate sets. As described above, use of a secondary transform for luma and chroma and accordingly the kernels selected depend on intra prediction modes for the luma and chroma channels respectively. The kernels can also depend on the block size of the corresponding luma and chroma TBs. the kernel selected for chroma also depends on the chroma subsampling ration of the bitstream. If only one kernel is available signalling is limited to apply or not apply the secondary transform (index range 0 to 1). If two kernels are available, the index values are 0 (not apply), 1 (apply first kernel), or 2 (apply second kernel). For chroma, the same secondary transform kernel is applied to each chroma channel and thus the residuals of the Cb block 1224 and the Cr block 1226 need to only include significant coefficients in positions subject to secondary transformation, as described with reference to FIGS. 9A-D. If joint CbCr coding is used, the requirement to only include significant coefficients in positions subject to secondary transformation is applicable only to the single coded chroma TB, as the resulting Cb and Cr residuals only contain significant coefficients in positions corresponding to significant coefficients in the joint coded TB. If the applicable colour channel(s) of a given secondary index are described by a single TB (single last position, e.g. 1228), i.e. luma always needs only one TB and chroma needs one TB when joint CbCr coding is in use, the secondary transform index may be coded immediately after coding the last position instead of after the TU, i.e. as index 1230 instead of 1220 (or 1221). Signalling the secondary transform earlier in the bitstream allows the video decoder 134 to commence application of the secondary transform as each residual coefficient of residual coefficients 1232 is decoded, reducing latency in the system 100.

In an arrangement of the video encoder 114 and the video decoder 134 a separate secondary transform index is signalled for each chroma TB, i.e. 1224 and 1226 when joint CbCr coding is not used, resulting in independent control of secondary transform for each colour channel. If each TB is independently controlled, the secondary transform index for each TB may be signalled immediately after the last position of the corresponding TB for luma and for chroma (regardless of application of joint CbCr mode or not).

Figure 13:
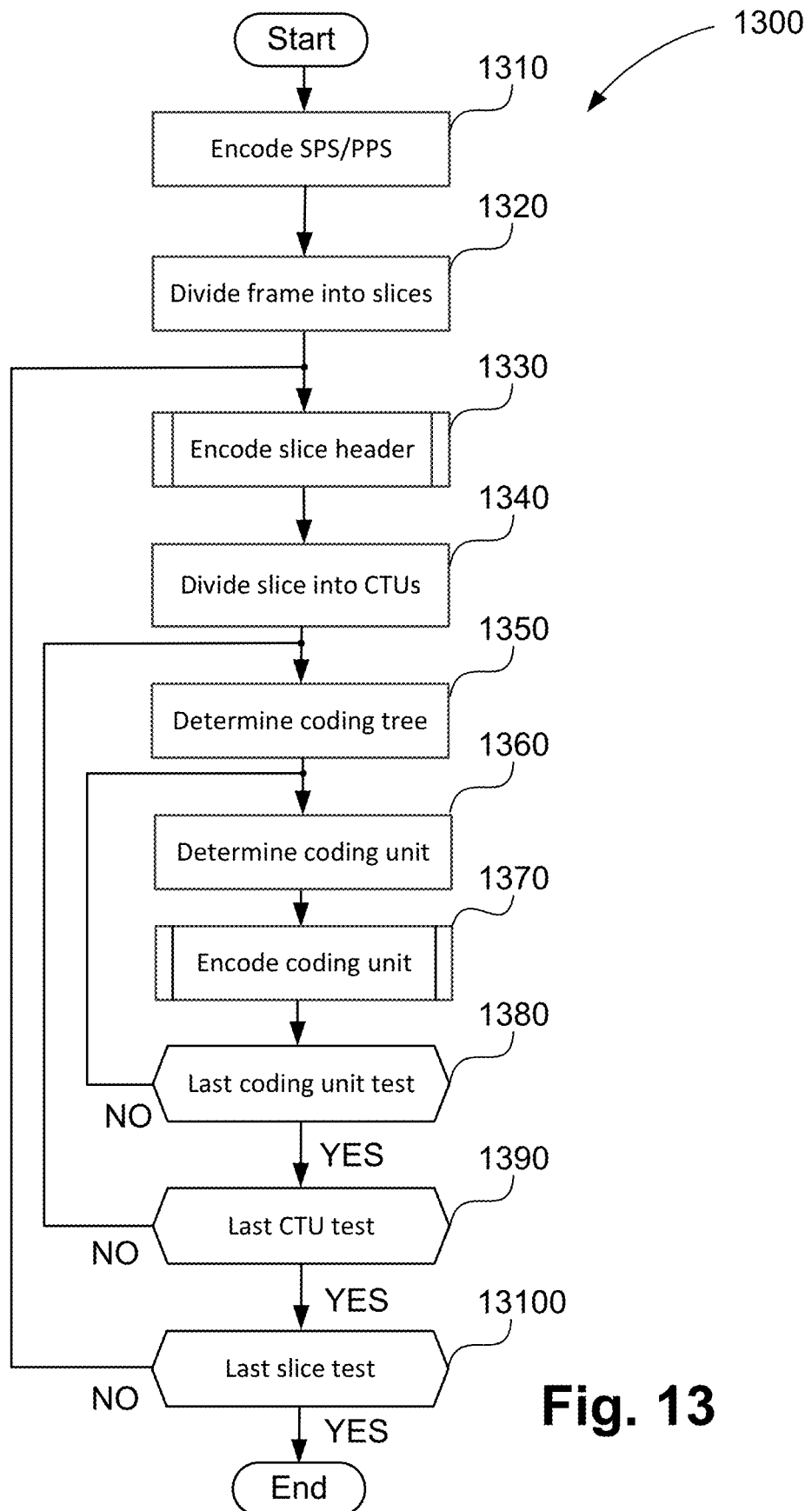
FIG. 13 shows a method for encoding a frame into a bitstream including one or more slices as sequences of coding units.

FIG. 13 shows a method 1300 for encoding the frame data 113 into the bitstream 115, the bitstream 115 including one or more slices as sequences of coding tree units. The method 1300 may be embodied by apparatus such as a configured FPGA, an ASIC, or an ASSP. Additionally, the method 1300 may be performed by the video encoder 114 under execution of the processor 205. Due to the workload of encoding a frame, steps of the method 1300 may be performed in different processors to share the workload, for example using contemporary multi-core processors, such that different slices are encoded by different processors. Moreover, the partitioning constraints and quantisation group definitions may vary from one slice to another as deemed beneficial for rate-control purposes in encoding each portion (slice) of the bitstream 115. For additional flexibility in encoding the residual of each coding unit, not only may the quantisation group subdivision level vary from one slice to another, application of the secondary transform is independently controllable for luma and chroma. As such, the method 1300 may be stored on computer-readable storage medium and/or in the memory 206.

The method 1300 begins at an encode SPS/PPS step 1310. At step 1310 the video encoder 114 encodes the SPS 1110 and the PPS 1112 into the bitstream 115 as sequences of fixed and variable length encoded parameters. A partition_constraints_override_enabled_flag is encoded as part of the SPS 1110, indicative that partition constraints are able to be overridden in the slice header (1118) of respective slices (such as 1116). Default partition constraints are also encoded as part of the SPS 1110 by the video encoder 114.

The method 1300 continues from step 1310 to a divide frame into slices step 1320. In execution of step 1320 the processor 205 divides the frame data 113 into one or more slices or contiguous portions. Where parallelism is desired, separate instances of the video encoder 114 encode each slice somewhat independently. A single video encoder 114 may process each slice sequentially, or some intermediate degree of parallelism may be implemented. Generally, the division of a frame into slices (contiguous portions) is aligned to boundaries of divisions of the frame into regions known as 'sub-pictures' or tiles or the like.

The method 1300 continues from step 1320 to an encode slice header step 1330. At step 1330 the entropy encoder 338 encodes the slice header 1118 into the bitstream 115. An example implementation of step 1330 is provided hereafter with reference to FIG. 14.

The method 1300 continues from step 1330 to a divide slice into CTUs step 1340. In execution of step 1340 the video encoder 114 divides the slice 1116 into a sequence of CTUs. Slice boundaries are aligned to CTU boundaries and CTUs in a slice are ordered according to a CTU scan order, generally a raster scan order. The division of a slice into CTUs establishes which portion of the frame data 113 is to be processed by the video encoder 113 in encoding the current slice.

The method 1300 continues from step 1340 to a determine coding tree step 1350. At step 1350 the video encoder 114 determines a coding tree for a current selected CTU in the slice. The method 1300 starts from the first CTU in the slice 1116 on the first invocation of the step 1350 and progresses to subsequent CTUs in the slice 1116 on subsequent invocations. In determining the coding tree of a CTU, a variety of combinations of quadtree, binary, and ternary splits are generated by the block partitioner 310 and tested.

The method 1300 continues from step 1350 to a determine coding unit step 1360. At step 1360 the video encoder 114 executes to determine 'optimal' encodings for the CUS resulting from various coding trees under evaluation using known methods. Determining optimal encodings involves determining a prediction mode (e.g. intra prediction with specific mode or inter prediction with motion vector), a transform selection (primary transform type and optional secondary transform type). If the primary transform type for the luma TB is determined to be DCT-2 or any quantised primary transform coefficient that is not subject to forward secondary transformation is significant, the secondary transform index for the luma TB may indicate application of the secondary transform. Otherwise the secondary transform index for luma indicates bypassing of the secondary transform. For the luma channel, the primary transform type is determined to be DCT-2, transform skip, or one of the MTS options for the chroma channels, DCT-2 is the available transform type. Determination of the secondary transform type is further described with reference to FIGS. 19A and 19B. Determining the encoding can also include determining a quantisation parameter where it is possible to change the QP, that is at a quantisation group boundary. In determining individual coding units the optimal coding tree is also determined, in a joint manner. When a coding unit is to be coded using intra prediction, a luma intra prediction mode and a chroma intra prediction are determined.

The determine coding unit step 1360 may inhibit testing application of the secondary transform when there are no 'AC' (coefficients in locations other than the top-left position of the transform block) residual coefficients present in the primary domain residual resulting from application of the DCT-2 primary transform. If secondary transform application is tested on transform blocks which only include a DC coefficient (last position indicates only the top-left coefficient of the transform block is significant) coding gain is seen. The inhibition of testing secondary transform when only a DC primary coefficient exists spans the blocks for which the secondary transform index applies, that is, Y, Cb and Cr for shared tree (with Y channel only when the Cb and Cr blocks are width or height of two samples) when a single index is coded. Even though a residual with a DC coefficient only is low in coding cost compared to a residual with at least one AC coefficient, application of a secondary transform even to a residual with only a significant DC coefficient results in a further reduction in the magnitude of the final coded DC coefficient. Even after further quantisation and/or rounding operations prior to coding, other (AC) coefficients have insufficient magnitude after secondary transformation to result in significant coded residual coefficient(s) in the bitstream. In a shared or separate tree coding tree, provided at least one significant primary coefficient exists, even if only DC coefficient(s) of the respective transform blocks, within the scope of application of the secondary transform index, the video encoder 114 tests for selection of non-zero secondary transform index values (that is, for application of the secondary transform).

The method 1300 continues from step 1360 to an encode coding unit step 1370. At step 1370 the video encoder 114 encodes the determined coding unit of the step 1360 into the bitstream 115. An example of how the coding unit is encoded is described in more detail with reference to FIG. 15.

The method 1300 continues from step 1370 to a last coding unit test step 1380. At step 1380 the processor 205 tests if the current coding unit is the last coding unit in the CTU. If not ("NO" at step 1380), control in the processor 205 progresses to the determine coding unit step 1360. Otherwise, if the current coding unit is the last coding unit ("YES" at step 1380) control in the processor 205 progresses to a last CTU test step 1390.

At the last CTU test step 1390 the processor 205 tests if the current CTU is the last CTU in the slice 1116. If not the last CTU in the slice 1116, control in the processor 205 returns to the determine coding tree step 1350. Otherwise, if the current CTU is the last ("YES" at step 1390), control in the processor progresses to a last slice test step 13100.

At the last slice test step 13100 the processor 205 tests if the current slice being encoded is the last slice in the frame. If not the last slice ("NO" at step 13100), control in the processor 205 progresses to the encode slice header step 1330. Otherwise, if the current slice is the last and all slices (contiguous portions) have been encoded ("YES" at step 13100) the method 1300 terminates.

Figure 14:
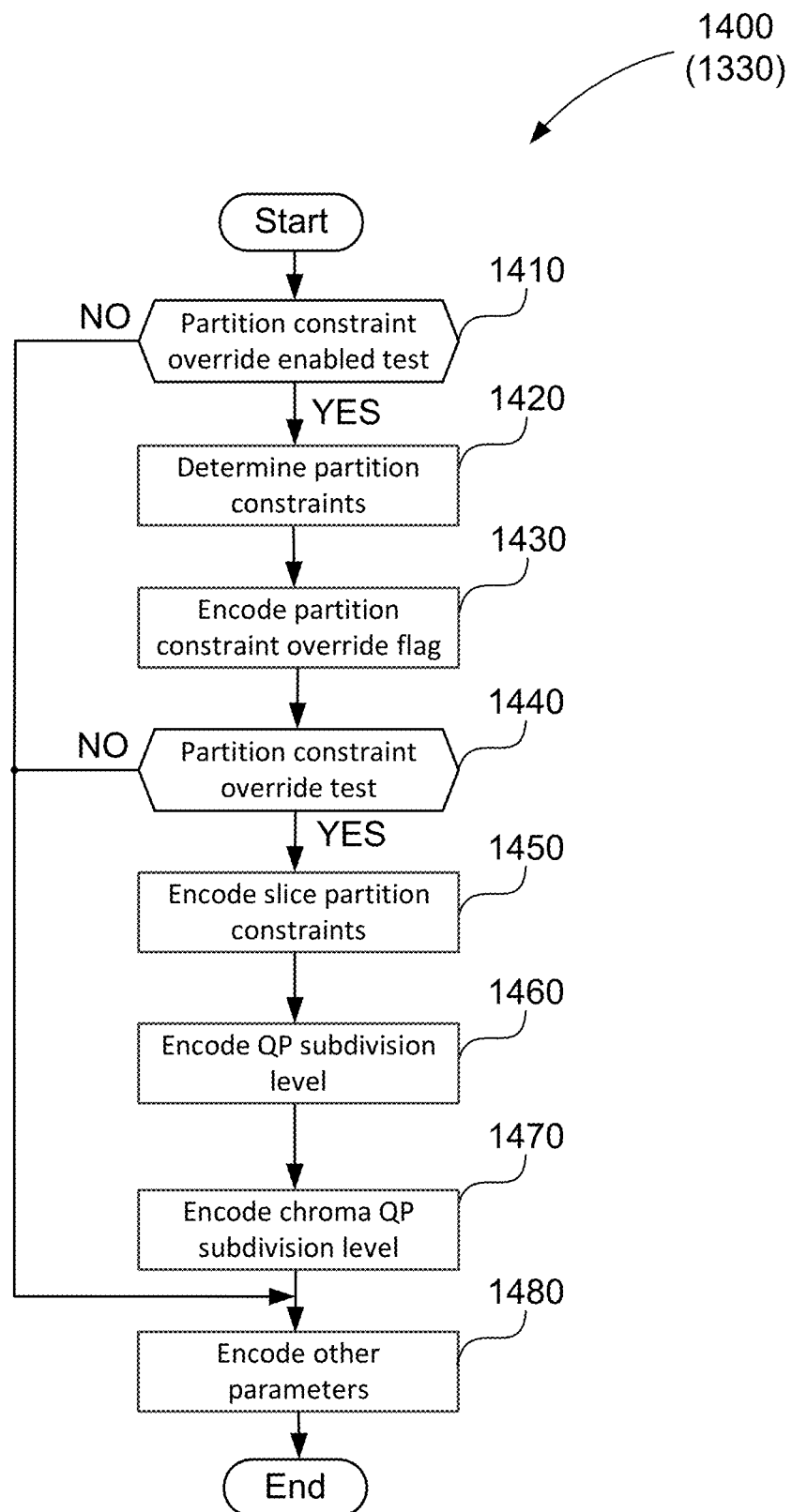
FIG. 14 shows a method for encoding a slice header into a bitstream.

FIG. 14 shows a method 1400 for encoding the slice header 1118 into the bitstream 115, as implemented at step 1330. The method 1400 may be embodied by apparatus such as a configured FPGA, an ASIC, or an ASSP. Additionally, the method 1400 may be performed by the video encoder 114 under execution of the processor 205. As such, the method 1400 may be stored on computer-readable storage medium and/or in the memory 206.

The method 1400 starts at a partition constraints override enabled test step 1410. At step 1410 the processor 205 tests if the partition constraints override enabled flag, as encoded in the SPS 1110, indicates that partition constraints may be overridden at the slice level. If partition constraints may be overridden at the slice level ("YES" at step 1410), control in the processor 205 progresses to a determine partition constraints step 1420. Otherwise, if partition constrains may not be overwritten at slice level ("NO" at step 1410), control in the processor 205 progresses to an encode other parameters step 1480.

At the determine partition constraints step 1420 the processor 205 determines partition constraints (e.g. maximum MTT split depth) suitable for the current slice 1116. In one example, the frame data 310 contains a projection of 360 degree view of a scene mapped into the 2D frame and divided into several sub-pictures. Depending on the selected viewport, certain slices may require higher fidelity and other slices may require lower fidelity. The partition constraints for a given slice may be set based on the fidelity requirement of the portion of the frame data 310 encoded by the slice (e.g. as per the step 1340). Where lower fidelity is deemed acceptable, a shallower coding tree with larger CUs is acceptable and so the maximum MTT depth may be set to a lower value. The subdivision level 1136, signalled with a flag cu_qp_delta_subdiv, is determined accordingly, at least in the range resulting from the determined maximum MTT depth 1134. A corresponding chroma subdivision level is also determined and signalled.

The method 1400 continues from step 1420 to an encode partition constraint override flag step 1430. At step 1430 the entropy encoder 338 encodes a flag into the bitstream 115 indicating whether the partition constraints as signalled in the SPS 1110 are to be overridden for the slice 1116. If partition constraints specific to the current slice were derived at the step 1420, the flag value would indicate usage of the partition constraint override functionality. If the constraints determined at the step 1420 match those already encoded in the SPS 1110 there is no need to override the partition constraints since there is no change to be signalled and the flag values are encoded accordingly.

The method 1400 continues from step 1430 to a partition constraint override test step 1440. At step 1440 the processor 205 tests the flag value encoded at the step 1430. If the flag indicates partition constraints are to be overridden ("YES" at step 1440) control in the processor 205 progresses to an encode slice partition constraints step 1450. Otherwise if partition constraints are not to be overridden ("NO" at step 1440), control in the processor 205 progresses to the encode other parameters step 1480.

The method 1400 continues from step 1440 to an encode slice partition constraints step 1450. In execution of step 1450 the entropy encoder 338 encodes the determined partition constraints for the slice into the bitstream 115. The partition constraints for the slice include 'slice_max_mtt_hierarchy_depth_luma', from which MaxMttDepthY 1134 is derived.

The method 1400 continues from step 1450 to an encode QP subdivision level step 1460. At step 1460 the entropy encoder 338 encodes a subdivision level for luma CBs using a 'cu_qp_delta_subdiv' syntax element, as described with reference to FIG. 11.

The method 1400 continues from step 1460 to an encode chroma QP subdivision level step 1470. At step 1470 the entropy encoder 338 encodes a subdivision level for signalling of CU chroma QP offsets using a 'cu_chroma_qp_offset_subdiv' syntax element, as described with reference to FIG. 11.

Steps 1460 and 1470 operate to encode an overall QP subdivisional level for a slice (contiguous portion) of a frame. The overall subdivisional level comprises both the subdivision level for luma coding units and the subdivision level for chroma coding units of the slice. The chroma and luma subdivision levels can be different, for example due to use of separate coding trees for luma and chroma in an I slice.

The method 1400 continues from step 1470 to the encode other parameters step 1480. At step 1480 the entropy encoder 338 encodes other parameters into the slice header 1118, such as those necessary for control of specific tools like deblocking, adaptive loop filter, optional selection of a scaling list (for non-uniform application of a quantisation parameter to a transform block) from one previously signalled. The method 1400 terminates upon execution of step 1480.

Figure 15:
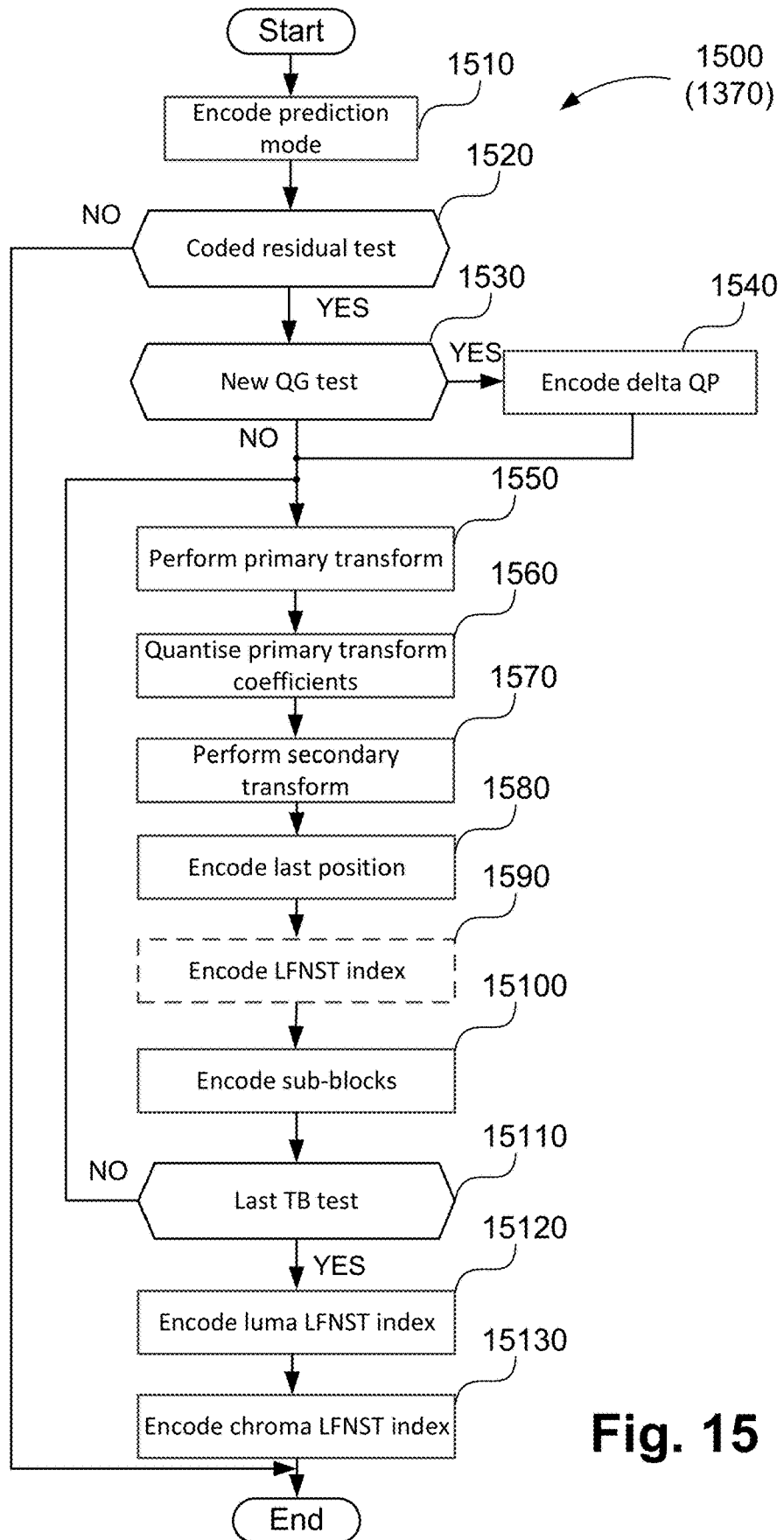
FIG. 15 shows a method for encoding a coding unit into a bitstream.

FIG. 15 shows a method 1500 for encoding a coding unit into the bitstream 115, corresponding to the step 1370 of FIG. 13. The method 1500 may be embodied by apparatus such as a configured FPGA, an ASIC, or an ASSP. Additionally, the method 1500 may be performed by the video encoder 114 under execution of the processor 205. As such, the method 1500 may be stored on computer-readable storage medium and/or in the memory 206.

The method 1500 starts at an encode prediction mode step 1510. At step 1510 the entropy encoder 338 encodes the prediction mode for the coding unit, as determined at the step 1360, into the bitstream 115. A 'pred_mode' syntax element is encoded to distinguish between use of intra prediction, inter prediction, or other prediction modes for the coding unit. If intra prediction is used for the coding unit then a luma intra prediction mode is encoded and a chroma intra prediction mode is encoded. If inter prediction is used for the coding unit then a 'merge index' may be encoded to select a motion vector from an adjacent coding unit for use by this coding unit, a motion vector delta may be encoded to introduce an offset to a motion vector derived from a spatially neighbouring block. A primary transform type is encoded to select between use of DCT-2 horizontally and vertically, transform skip horizontally and vertically, or combinations of DCT-8 and DST-7 horizontally and vertically for the luma TB of the coding unit.

The method 1500 continues from step 1510 to a coded residual test step 1520. At step 1520 the processor 205 determines if a residual needs to be coded for the coding unit. If there are any significant residual coefficients to be coded for the coding unit ("YES" at step 1520) control in the processor 205 progresses to a new QG test step 1530. Otherwise if there are no significant residual coefficients for coding ("NO" at step 1520) the method 1500 terminates, as all information needed to decode the coding unit is present in the bitstream 115.

At the new QG test step 1530 the processor 205 determines if the coding unit corresponds to a new quantisation group. If the coding unit corresponds to a new quantisation group ("YES" at step 1530) control in the processor 205 progresses to an encode delta QP step 1540. Otherwise if the coding unit does not relate to a new quantisation group ("NO" at step 1530) control in the processor 205 progresses to a perform primary transform step 1550. In encoding each coding unit, nodes of the coding tree of the CTU are traversed at step 1530. When any of the child nodes of a current node have a subdivision level less than or equal to the subdivision level 1136 for the current slice, as determined from "cu_qp_delta_subdiv", a new quantisation group begins in the area of the CTU corresponding to the node and step 1530 returns "YES". The first CU in the quantisation group to include a coded residual will also include a coded delta QP, signalling any change to the quantisation parameter applicable to residual coefficients in this quantisation group.

At the encode delta QP step 1540 the entropy encoder 338 encodes a delta QP into the bitstream 115. The delta QP encodes a difference between a predicted QP and the intended QP for use in the current quantisation group. The predicted QP is derived by averaging the QPs of neighbouring earlier (above and left) quantisation groups. When the subdivision level is lower, the quantisation groups are larger and delta QP is coded less frequently. Less frequent coding of delta QP results in lower overhead for signalling changes in QP but also less flexibility in rate control. Selection of the quantisation parameter for each quantisation group is performed by a QP controller module 390 which typically implements a rate control algorithm to target a specific bitrate for the bitstream 115, somewhat independently of changes in the statistics of the underlying frame data 113. The method 1500 continues from step 1540 to the perform primary transform step 1550.

At the perform primary transform step 1550 the forward primary transform module 326 performs a primary transform according to the primary transform type of the coding unit, resulting in primary transform coefficients 328. The primary transform is performed on each colour channel, firstly on the luma channel (Y) and then upon Cb, and Cr TBs upon subsequent invocations of the step 1550 for the current TU. For the luma channel, the primary transform type (DCT-2, transform skip, MTS options) is performed and for the chroma channels, DCT-2 is performed.

The method 1500 continues from step 1550 to a quantise primary transform coefficients step 1560. At step 1560 the quantiser module 334 quantises the primary transform coefficients 328 according to the quantisation parameter 392 to produce quantised primary transform coefficients 332. The delta QP is used when present to encode the transform coefficients 328.

The method 1500 continues from step 1560 to a perform secondary transform step 1570. At step 1570 the secondary transform module 330 performs a secondary transform according to the secondary transform index 388 for the current transform block on the quantised primary transform coefficients 332 to produce secondary transform coefficients 336. Although the secondary transform is performed after quantisation, the primary transform coefficients 328 may retain a higher degree of precision compared to the final intended quantiser step size of the quantisation parameter 392, for example magnitudes may be 16X larger than those that would result directly from application of the quantisation parameter 392, i.e. four additional bits of precision would be retained. Retaining additional bits of precision in the quantised primary transform coefficients 332 allows the secondary transform module 330 to operate with greater accuracy on coefficients in the primary coefficient domain. After application of the secondary transform, a final scaling (e.g. right-shift by four bits) at step 1560 results in quantisation to the intended quantiser step size of the quantisation parameter 392. Application of a 'scaling list' is performed on the primary transform coefficients, which correspond to well-known transform basis functions (DCT-2, DCT-8, DST-7) rather than operating on secondary transform coefficients, which result from the trained secondary transform kernels. When the secondary transform index 388 for the transform block indicates no application of a secondary transform (index value equal to zero) the secondary transform is bypassed. That is, the primary transform coefficients 332 are propagated through the secondary transform module 330 unchanged to become the secondary transform coefficients 336. A luma secondary transform index is used, in conjunction with a luma intra prediction mode, to select a secondary transform kernel for application to the luma TB. A chroma secondary transform index is used, in conjunction with a chroma intra prediction mode, to select a secondary transform kernel for application to the chroma TBs.

The method 1500 continues from step 1570 to an encode last position step 1580. At step 1580 the entropy encoder 338 encodes the position of the last significant coefficient in the secondary transform coefficients 336 for a current transform block into the bitstream 115. Upon the first invocation of the step 1580, the luma TB is considered and subsequent invocations consider Cb and then Cr TBs.

In arrangements where the secondary transform index 388 is encoded immediately after the last position, the method 1500 continues to an encode LFNST index step 1590. At step 1590 the entropy encoder 338 encodes the secondary transform index 338 into the bitstream 115 as an 'Ifnst_index', using a truncated unary codeword, if the secondary transform index was not inferred to be zero based upon the last position encoded at step 1580. Each CU has one luma TB, allowing the step 1590 to be performed for luma blocks and when a 'joint' coding mode is used for chroma a single chroma TB is coded and so the step 1590 may be performed for chroma. Knowledge of the secondary transform index prior to decoding each residual coefficient enables the secondary transform to be applied on a coefficient-by-coefficient basis, e.g. using multiply-and-accumulate logic, as coefficients are decoded. The method 1500 continues from step 1590 to an encode sub-blocks step 15100.

If the secondary transform index 388 is not encoded immediately after the last position, the method 1500 continues from step 1580 to the encode sub-blocks step 15100. At the encode sub-blocks step 15100 the residual coefficients of the current transform block (336), are encoded into the bitstream 115 as a series of sub-blocks. The residual coefficients are encoded progressing from the sub-block containing the last significant coefficient position back to the sub-block containing the DC residual coefficient.

The method 1500 continues from step 15100 to a last TB test step 15110. At step the processor 205 tests if the current transform block is the last one in a progression over the colour channels, i.e. Y, Cb, and Cr. If the just-encoded transform block is for a Cr TB ("YES" at step 15110) control in the processor 205 progresses to an encode luma LFNST index step 15120. Otherwise, if the current TB is not the last ("YES" at 15110) control in the processor 205 returns to the perform primary transform step 1550 and the next TB (Cb or Cr is selected).

The steps 1550 to 15110 are described in relation to an example of a shared coding tree structure where the prediction mode is intra prediction and uses DCT-2. Operation of steps such as performing the primary transform (1550), quantising primary transform coefficients (1560) and encoding the last position (1590) can be implemented for inter prediction modes or for intra prediction modes other than for a shared coding tree structure using known methods. Steps 1510 to 1540 can be implemented regardless of the prediction mode or coding tree structure.

The method 1500 continues from step 15110 to the encode luma LFNST index step 15120. At step 15120 the secondary transform index applied to the luma TB is encoded into the bitstream 115 by the entropy encoder 338, if not inferred to be zero (secondary transform not applied). The luma secondary transform index is inferred to be zero if the last significant position for the luma TB indicates a significant primary-only residual coefficient or if a primary transform other than DCT-2 is performed. Additionally, the secondary transform index applied to the luma TB is encoded into the bitstream only for coding units using intra prediction and a shared coding tree structure. The secondary transform index applied to the luma TB is encoded using the flag 1220 (or the flag 1230 for joint CbCr mode).

The method 1500 continues from step 15120 to an encode chroma LFNST index step 15130. At step 1530 the secondary transform index applied to the chroma TBs is encoded into the bitstream 115 by the entropy encoder 338, if the chroma secondary transform index is not inferred to be zero (secondary transform not applied). The chroma secondary transform index is inferred to be zero if the last significant position for either chroma TB indicates a significant primary-only residual coefficient. The method 1500 terminates upon execution of step 15130, with control in the processor 205 returning to the method 1300. The secondary transform index applied to the chroma TBs is encoded into the bitstream only for coding units using intra prediction and a shared coding tree structure. The secondary transform index applied to the chroma TBs is encoded using the flag 1221 (or the flag 1230 for joint CbCr mode).

Figure 16:
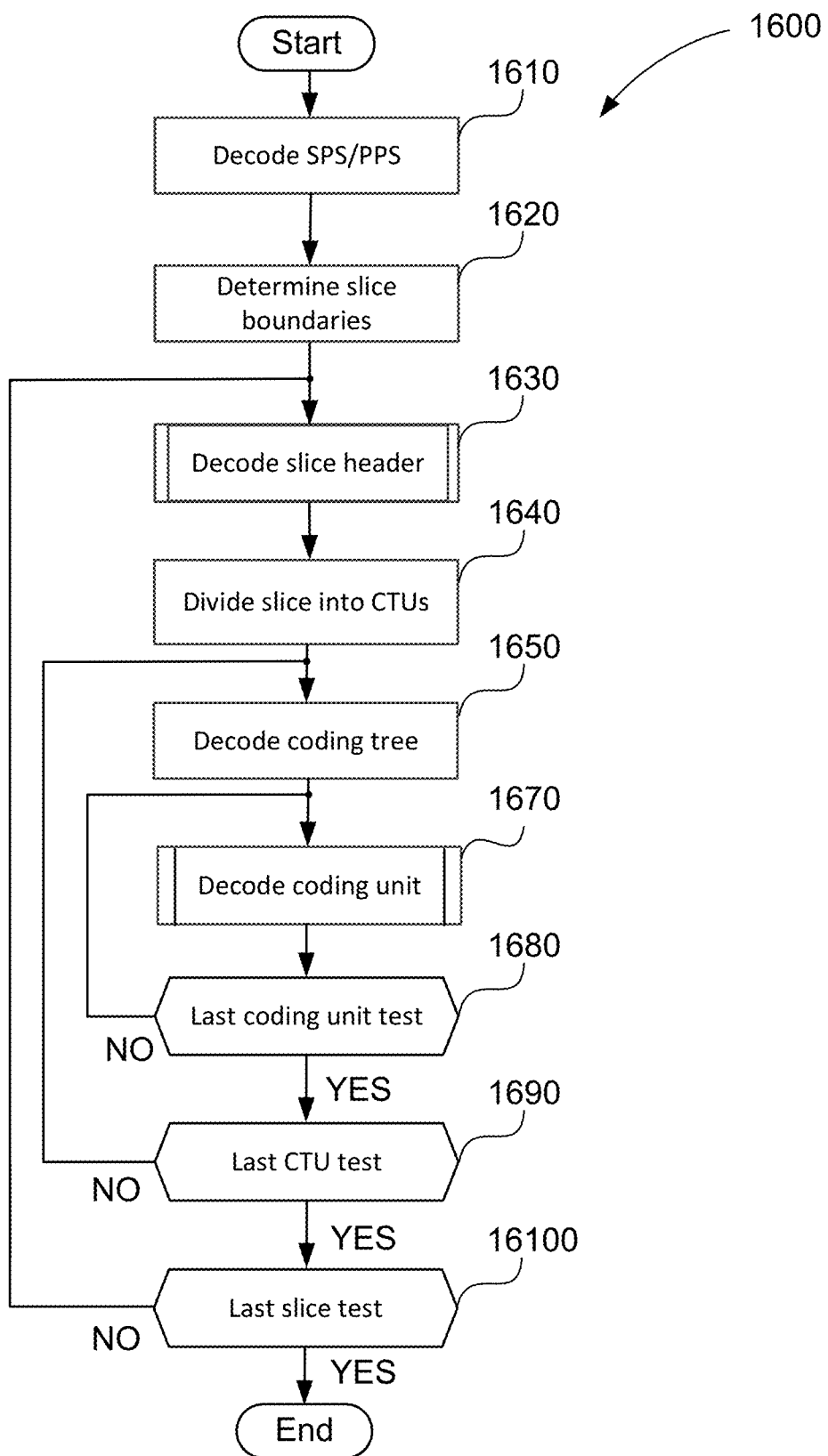
FIG. 16 shows a method for decoding a frame from a bitstream as sequences of coding units arranged into slices.

FIG. 16 shows a method 1600 for decoding a frame from a bitstream as sequences of coding units arranged into slices. The method 1600 may be embodied by apparatus such as a configured FPGA, an ASIC, or an ASSP. Additionally, the method 1600 may be performed by the video decoder 134 under execution of the processor 205. As such, the method 1600 may be stored on computer-readable storage medium and/or in the memory 206.

The method 1600 decodes a bitstream as encoded using the method 1300 in which the partitioning constraints and quantisation group definitions may vary from one slice to another as deemed beneficial for rate-control purposes in encoding each portion (slice) of the bitstream 115. Not only may the quantisation group subdivision level vary from one slice to another, application of the secondary transform is independently controllable for luma and chroma.

The method 1600 begins at a decode SPS/PPS step 1610. In execution of step 1610 the video decoder 134 decodes the SPS 1110 and the PPS 1112 from the bitstream 133 as sequences of fixed and variable length parameters. A partition_constraints_override_enabled_flag is decoded as part of the SPS 1110, indicative of whether partition constraints are able to be overridden in the slice header (e.g. 1118) of respective slices (e.g. 1116). The default (that is, as signalled in the SPS 1110 and used in a slice in the absence of subsequent overriding) partition constraint parameters 1130 are also decoded as part of the SPS 1110 by the video decoder 134.

The method 1600 continues from step 1610 to a determine slice boundaries step 1620. In execution of step 1620 the processor 205 determines the location of slices in the current access unit in the bitstream 133. Generally, slices are identified by determining NAL unit boundaries (by detecting 'start codes') and, for each NAL unit, reading a NAL unit header that includes a 'NAL unit type'. Specific NAL unit types identify slice types, such as 'I slices', 'P slices', and 'B slices'. Having identified slice boundaries, the application 233 may distribute performance of subsequent steps of the method 1600 on different processors, e.g. in a multi-processor architecture, for parallel decoding. Different slices may be decoded by each processor in the multi-processor system for higher decoding throughput.

The method 1600 continues from step 1610 to a decode slice header step 1630. At step 1630 the entropy decoder 420 decodes the slice header 1118 from the bitstream 133. An example method of decoding the slice header 1118 from the bitstream 133, as implemented at step 1630 is described hereafter with reference to FIG. 17.

The method 1600 continues from step 1630 to a divide slice into CTUs step 1640. At step 1640 the video decoder 134 divides the slice 1116 into a sequence of CTUs. Slice boundaries are aligned to CTU boundaries and CTUs in a slice are ordered according to a CTU scan order. The CTU scan order is generally a raster scan order. The division of a slice into CTUs establishes which portion of the frame data 113 is to be processed by the video decoder 134 in decoding the current slice.

The method 1600 continues from step 1640 to a decode coding tree step 1650. In execution of step 1650 the video decoder 133 decodes a coding tree for a current CTU in the slice from the bitstream 133, starting from the first CTU in the slice 1116 on the first invocation of the step 1650. The coding tree of a CTU is decoded by decoding split flags in accordance with FIG. 6. In subsequent iterations of the step 1650 for a CTU the decoding is performed for subsequent CTUs in the slice 1116. If the coding tree was encoded using intra prediction mode and a shared coding tree structure, the coding unit has a primary colour channel (luma or Y) and at least one secondary colour channel (chroma, Cb and Cr or CbCr). In this event decoding the coding tree relates to decoding a coding unit including the primary colour channel and at least one secondary colour channel according to split flags of the coding tree unit.

The method 1600 continues from step 1660 to a decode coding unit step 1670. At step 1670 the video decoder 134 decodes a coding unit from the bitstream 133. An example method of decoding a coding unit, as implemented at step 1670 is described hereafter with reference to FIG. 18.

The method 1600 continues from step 1610 to a last coding unit test step 1680. At step 1680 the processor 205 tests if the current coding unit is the last coding unit in the CTU. If not the last coding unit ("NO" at step 1680), control in the processor 205 returns to to the decode coding unit step 1670 to decode a next coding unit of the coding tree unit. If the current coding unit is the last coding unit ("YES" at step 1680) control in the processor 205 progresses to a last CTU test step 1690.

At the last CTU test step 1690 the processor 205 tests if the current CTU is the last CTU in the slice 1116. If not, the last CTU in the slice ("NO" at step 1690), control in the processor 205 returns to the decode coding tree step 1650 to decode the next coding tree unit of the slice 1116. If the current CTU is the last CTU for the slice 1116 ("YES" at step 1690) control in the processor 205 progresses to a last slice test step 16100.

At the last slice test step 16100 the processor 205 tests if the current slice being decoded is the last slice in the frame. If not the last slice in the frame ("NO" at step 16100), control in the processor 205 returns to the decode slice header step 1630 and the step 1630 operates to decode the slice header for the next slice (for example "Slice 2" of FIG. 11) in the frame. If the current slice is the last slice in the frame ("YES" at step 1600) the method 1600 terminates.

Operation of the method 1600 for a plurality of the coding units operates to produce an image frame, as described in relation to the device 130 at FIG. 1.

Figure 17:
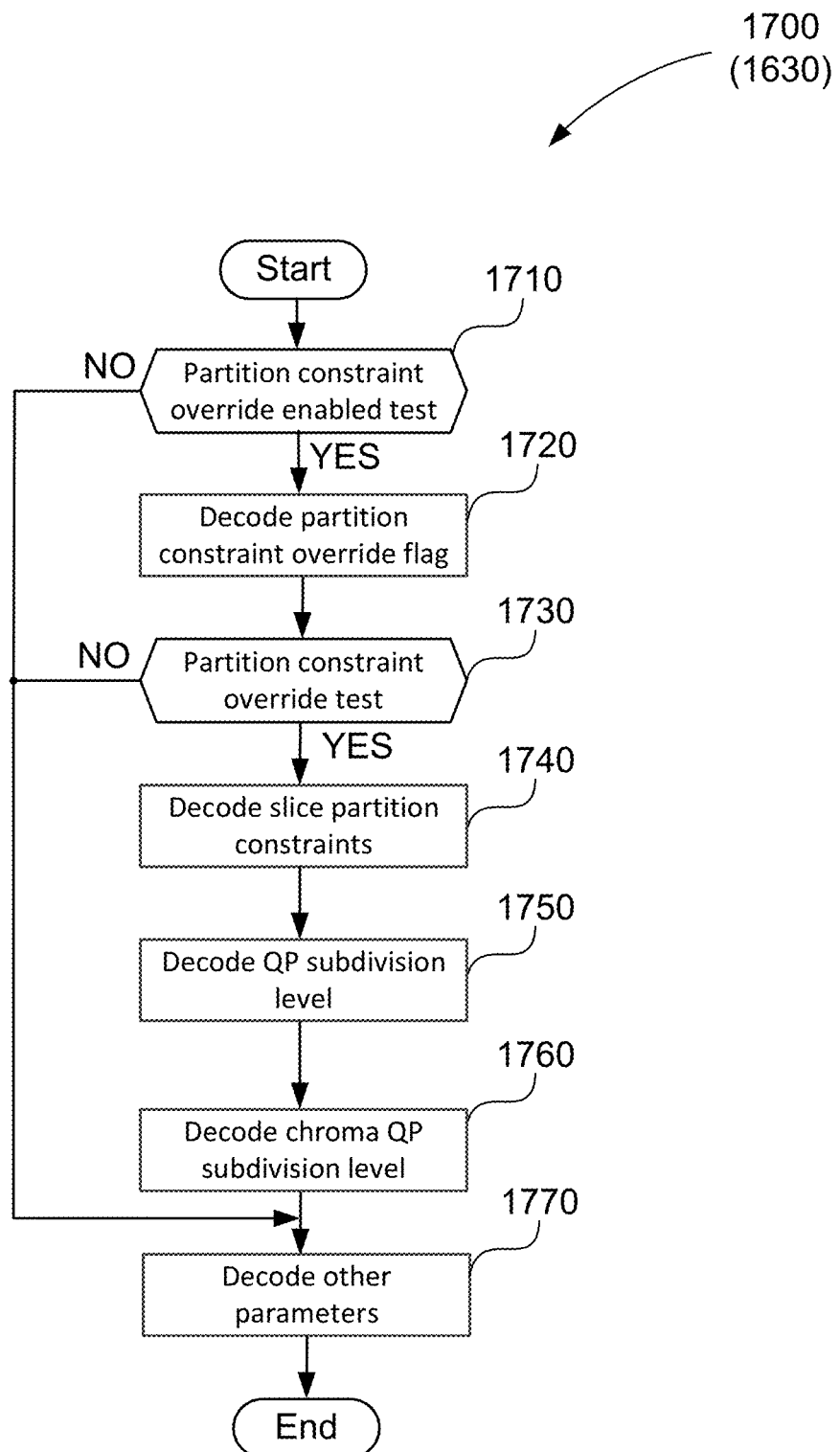
FIG. 17 shows a method for decoding a slice header from a bitstream.

FIG. 17 shows a method 1700 for decoding a slice header into a bitstream, as implemented at step 1630. The method 1700 may be embodied by apparatus such as a configured FPGA, an ASIC, or an ASSP. Additionally, the method 1700 may be performed by the video decoder 134 under execution of the processor 205. As such, the method 1700 may be stored on computer-readable storage medium and/or in the memory 206.

Similarly to the method 1500, the method 1700 in executed for a current slice or contiguous portion (1116) in the frame, for example the frame 1101. The method 1700 begins at a partition constraints override enabled test step 1710. At step 1710 the processor 205 tests if the partition constraints override enabled flag, as decoded from the SPS 1110, indicates that partition constraints may be overridden at the slice level. If partition constraints may be overridden at the slice level ("YES" at step 1710) control in the processor 205 progresses to a decode partition constraints override flag step 1720. Otherwise, if the partition constraints override enabled flag indicates that constraints may not be overridden at the slice level ("NO" at step 1710) control in the processor 205 progresses to a decode other parameters step 1770.

At a decode partition constraint override flag step 1720 the entropy decoder 420 decodes a partition constraint override flag from the bitstream 133. The decoded flag indicates whether the partition constraints as signalled in the SPS 1110 are to be overridden for the current slice 1116.

The method 1700 continues from step 1720 to a partition constraint override test step 1730. In execution of step 1730 the processor 205 tests the flag value decoded at the step 1720. If the decoded flag indicates partition constraints are to be overridden ("YES" at step 1730) control in the processor 205 progresses to a decode slice partition constraints step 1740. Otherwise if the decoded flag indicates that partition constraints are not to be overridden ("NO" at step 1730) control in the processor 205 progresses to the decode other parameters step 1770.

At the decode slice partition constraints step 1740 the entropy decoder 420 decodes the determined partition constraints for the slice from the bitstream 133. The partition constraints for the slice include 'slice_max_mtt_hierarchy_depth_luma', from which MaxMttDepth Y 1134 is derived.

The method 1700 continues from step 1740 to a decode QP subdivision level step 1750. At step 1720 the entropy decoder 420 decodes a subdivision level for luma CBs using a 'cu_qp_delta_subdiv' syntax element, as described with reference to FIG. 11.

The method 1700 continues from step 1750 to a decode chroma QP subdivision level step 1760. At step 1760 the entropy decoder 420 decodes a subdivision level for signalling of CU chroma QP offsets using a 'cu_chroma_qp_offset_subdiv' syntax element, as described with reference to FIG. 11.

Steps 1750 and 1760 operate to determine a subdivision level for a particular contiguous portion (slice) of the bitstream. Repeated iterations between steps 1630 and 16100 operate to determine a subdivision level for each contiguous portion (slice) in the bitstream. As described hereafter, each subdivisional level is applicable to the coding units of the corresponding slice (contiguous portion).

The method 1700 continues from step 1760 to the decode other parameters step 1770. At step 1770 the entropy decoder 420 decodes other parameters from the slice header 1118, such as the parameters necessary for control of specific tools like deblocking, adaptive loop filter, optional selection of a scaling list (for non-uniform application of a quantisation parameter to a transform block) from one previously signalled. The method 1700 terminates upon execution of step 1770.

Figure 18:
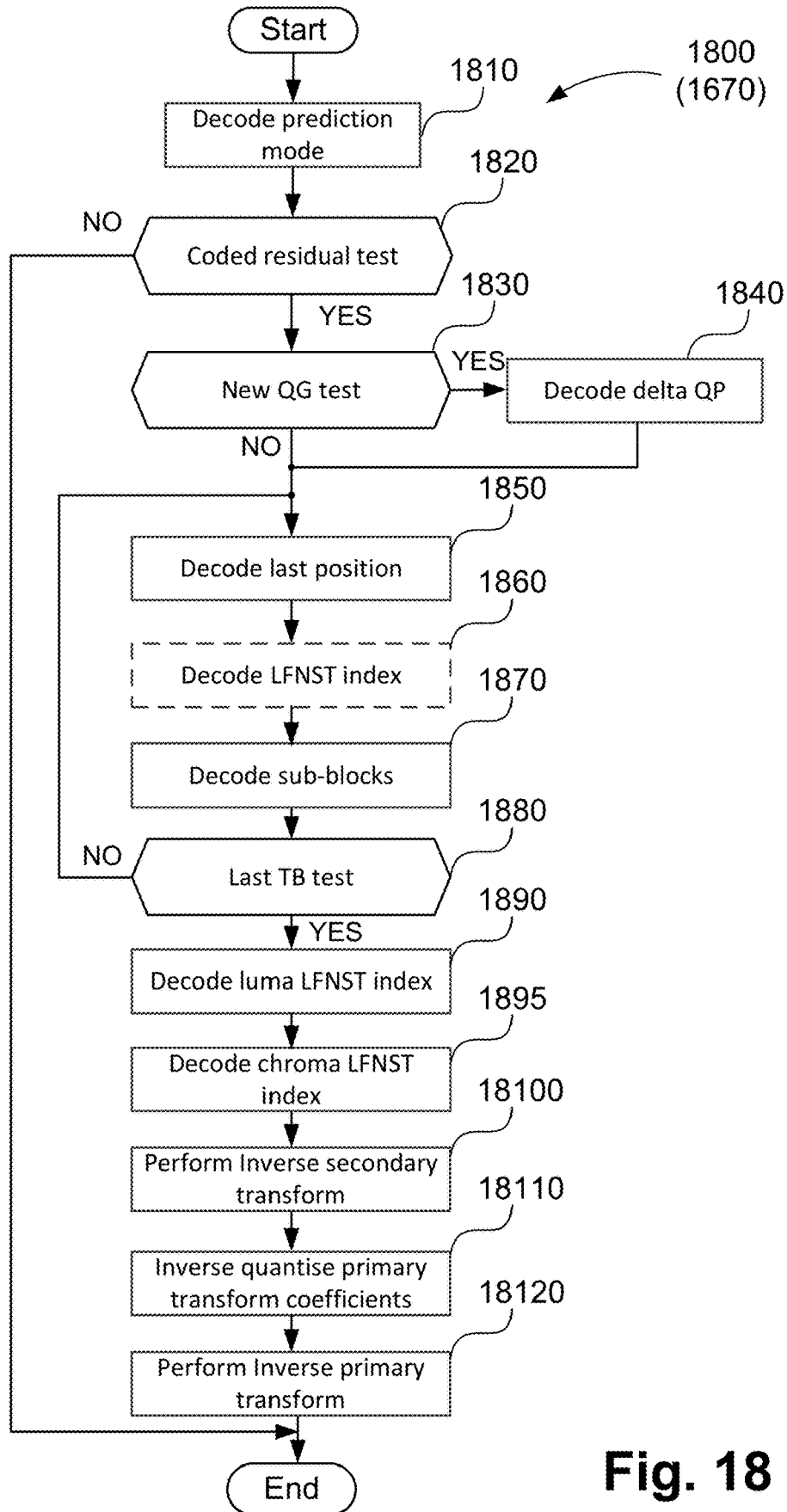
FIG. 18 shows a method for decoding a coding unit from a bitstream.

FIG. 18 shows a method 1800 for decoding a coding unit from a bitstream. The method 1800 may be embodied by apparatus such as a configured FPGA, an ASIC, or an ASSP. Additionally, the method 1800 may be performed by the video decoder 134 under execution of the processor 205. As such, the method 1800 may be stored on computer-readable storage medium and/or in the memory 206.

The method 1800 is implemented for a current coding unit of a current CTU (for example CTU0 of the slice 1116). The method 1800 starts at a decode prediction mode step 1810. At step 1800 the entropy decoder 420 decodes the prediction mode of the coding unit, as determined at the step 1360 of FIG. 13, from the bitstream 133. A 'pred_mode' syntax element is decoded at step 1810 to distinguish between use of intra prediction, inter prediction, or other prediction modes for the coding unit.

If intra prediction is used for the coding unit a luma intra prediction mode and a chroma intra prediction mode are also decoded at step 1810. If inter prediction is used for the coding unit a 'merge index' may also be decoded at step 1810 to determine a motion vector from an adjacent coding unit for use by this coding unit, a motion vector delta may be decoded to introduce an offset to a motion vector derived from a spatially neighbouring block. A primary transform type is also decoded at step 1810 to select between use of DCT-2 horizontally and vertically, transform skip horizontally and vertically, or combinations of DCT-8 and DST-7 horizontally and vertically for the luma TB of the coding unit.

The method 1800 continues from step 1810 to a coded residual test step 1820. In execution of step 1820 the processor 205 determines if a residual needs to be decoded for the coding unit by using the entropy decoder 420 to decode a 'root coded block flag' for the coding unit. If there are any significant residual coefficients to be decoded for the coding unit ("YES" at step 1820) control in the processor 205 progresses to a new QG test step 1830. Otherwise if there are no residual coefficients to be decoded ("NO" at step 1820) the method 1800 terminates, as all information needed to decode the coding unit has been obtained in the bitstream 115. Upon termination of the method 1800, subsequent steps such as PB generation, application of in-loop filtering is performed, producing decoded samples, as described with reference to FIG. 4.

At the new QG test step 1830 the processor 205 determines if the coding unit corresponds to a new quantisation group. If the coding unit corresponds to a new quantisation group ("YES" at step 1830) control in the processor 205 progresses to a decode delta QP step 1840. Otherwise if the coding unit does not correspond to a new quantisation group ("NO" at step 1830) control in the processor 205 progresses to a decode last position step 1850. A new quantisation group relates to the subdivision level of the current mode or coding unit. In decoding each coding unit, nodes of the coding tree of the CTU are traversed. When any of the child nodes of a current node have a subdivision level less than or equal to the subdivision level 1136 for the current slice, i.e. as determined from "cu_qp_delta_subdiv", a new quantisation group begins in the area of the CTU corresponding to the node. The first CU in the quantisation group to include a coded residual coefficient will also include a coded delta QP, signalling any change to the quantisation parameter applicable to residual coefficients in this quantisation group.

Effectively a single (at most one) quantisation parameter delta is decoded for each area (quantisation group). As described in relation to FIGS. 8A to 8C, cach area (quantisation group) is based on decomposition of coding tree units of each slice and he corresponding subdivision level (for example as encoded at steps 1460 and 1470). In other words, cach area or quantisation group is based on a comparison of a subdivision level associated with the coding units to the determined subdivision level for the corresponding contiguous portion.

At the decode delta QP step 1840 the entropy decoder 420 decodes a delta QP from the bitstream 133. The delta QP encodes a difference between a predicted QP and the intended QP for use in the current quantisation group. The predicted QP is derived by averaging the QPs of neighbouring (above and left) quantisation groups.

The method 1800 continues from step 1840 to the decode last position step 1850. In execution of step 1850 the entropy decoder 420 decodes the position of the last significant coefficient in the secondary transform coefficients 424 for the current transform block from the bitstream 133. Upon the first invocation of the step 1850, the step is executed for the luma TB. In subsequent invocations of step 1850 for the current CU the step is executed for the Ch TB. If the last position indicates a significant coefficient outside the secondary transform coefficient set (i.e. outside of 928 or 966) for a luma block or a chroma block, the secondary transform index for the luma or chroma channel, respectively, is inferred to be zero. The step is implemented for the Cr TB in the iteration after that for Cb.

As described in relation to step 1590 of FIG. 15, in some arrangements the secondary transform index is encoded immediately after the last significant coefficient position of the coding unit. In decoding the same coding unit, the secondary transform index 470 is decoded immediately after decoding the position of the last significant residual coefficient of the coding unit if the secondary transform index 470 was not inferred to be zero based upon the location of the last position for the TB decoded at the step 1840. In arrangements where the secondary transform index 470 is decoded immediately after the last significant coefficient position of the coding unit, at the method 1800 continues from step 1850 to a decode LFNST index step 1860. In execution of step 1860 the entropy decoder 420 decodes the secondary transform index 470 from the bitstream 133 as an 'Ifnst_index', using a truncated unary codeword when all significant coefficients are subject to secondary inverse transformation (e.g. within 928 or 966). The secondary transform index 470 can be decoded for a luma TB or for chroma when a joint coding of the chroma TBs using a single transform block is performed. The method 1800 continues from step 1860 to a decode sub-blocks step 1870.

If the secondary transform index 470 is not decoded immediately after the last significant position of the coding unit, the method 1800 continues from step 1850 to the decode sub-blocks step 1870. At step 1870 the residual coefficients of the current transform block, i.e. 424, are decoded from the bitstream 133 as a series of sub-blocks, progressing from the sub-block containing the last significant coefficient position back to the sub-block containing the DC residual coefficient.

The method 1800 continues from step 1870 to a last TB test step 1880. In execution of step 1880 the processor 205 tests if the current transform block is the last transform block in a progression over the colour channels, i.e. Y, Cb, and Cr. If the just-decoded (current) transform block is for a Cr TB then control in the processor 205 all TBs have been decoded ("YES" at step 1880) the method 1800 progresses to a decode luma LFNST index step 1890. Otherwise, if TBs have not been decoded ("NO" at step 1880) control in the processor 205 returns to the decode last position step 1850. The next TB (following the order of Y, Cb, Cr) is selected for decoding at the iteration of step 1850.

The method 1800 continues from step 1880 to a decode luma LFNST index step 1890. In execution of step 1890 the secondary transform index 470 to be applied to the luma TB is decoded from the bitstream 133 by the entropy decoder 420 if the last position of the luma TB is within the set of coefficients subject to secondary inverse transformation (e.g. 928 or 966) and the luma TB is using DCT-2 horizontally and vertically as the primary transform. If the last significant position of the luma TB indicates the presence of a significant primary coefficient outside the set of coefficients subject to secondary inverse transformation (e.g. outside of 928 or 966) the luma secondary transform index is inferred to be zero (secondary transform not applied). The secondary transform index decoded at step 1890 is indicated as 1220 in FIG. 12 (or 1230 in joint CbCr mode).

The method 1800 continues from step 1890 to a decode chroma LFNST index step 1895. At step 1895 the secondary transform index 470 to be applied to the chroma TBs is decoded from the bitstream 133 by the entropy decoder 420 if the last positions for each chroma TB are within the set of coefficients subject to secondary inverse transformation (e.g. 928 or 966). If the last significant position of the either chroma TB indicates the presence of a significant primary coefficient outside the set of coefficients subject to secondary inverse transformation (e.g. outside of 928 or 966) then the chroma secondary transform index is inferred to be zero (secondary transform not applied). The secondary transform index decoded at step 1895 is indicated as 1221 in FIG. 12 (or 1230 in joint CbCr mode). In decoding a separate index for luma and chroma, either separate arithmetic contexts for each truncated unary codeword may be used or the contexts may be shared such that the nth bin of each of the luma and chroma truncated unary codewords share the same context.

Effectively, the steps 1890 and 1895 relate to decoding a first index (such as 1220) to select a kernel for a luma (primary colour) channel and a second index (such as 1221) to select a kernel for at least one chroma (secondary colour channel) respectively.

The method 1800 continues from step 1895 to a perform inverse secondary transform step 18100. At step the inverse secondary transform module 436 performs an inverse secondary transform according to the secondary transform index 470 for the current transform block on the decoded residual transform coefficients 424 to produce secondary transform coefficients 432. The secondary transform index decoded at the step 1890 is applied to the luma TB and the secondary transform index decoded at the step 1895 is applied to the chroma TBs. Kernel selection for luma and chroma also depends on the luma intra prediction mode and the chroma intra prediction mode, respectively (each of which was decoded at the step 1810). Step 18100 selects a kernel according to the LFNST index for luma and a kernel according to the LFNST index for chroma.

The method 1800 continues from step 18100 to an inverse quantise primary transform coefficients step 18110. At step 18110 the inverse quantiser module 428 inverse quantises the secondary transform coefficients 432 according to the quantisation parameter 474 to produce the inverse quantised primary transform coefficients 440. If a delta QP was decoded at step 1840, the entropy decoder 420 determines the quantisation parameter according to the delta QP for the quantisation group (area) and the quantisation parameter of earlier coding units of the image frame. As described hereinbefore, the earlier coding units typically relate to neighbouring, above-left coding units.

The method 1800 continues from step 1870 to a perform primary transform step 18120. At step 1820 the inverse primary transform module 444 performs an inverse primary transform according to the primary transform type of the coding unit, resulting in the transform coefficients 440 being converted to residual samples 448 of the spatial domain. The inverse primary transform is performed on each colour channel, firstly on the luma channel (Y) and then upon Cb, and Cr TBs upon subsequent invocations of the step 1650 for the current TU. Steps 18100 to 18120 effectively operate to decode the current coding unit by applying the kernel selected according to the LFNST index for luma at step 1890 to the decoded residual coefficients of the luma channel and applying the kernel selected according to the LFNST index for chroma at step 1890 to the decoded residual coefficients for at least one chroma channel.

The method 1800 terminates upon execution of step 18120, with control in the processor 205 returning to the method 1600.

The steps 1850 to 18120 are described in relation to an example of a shared coding tree structure where the prediction mode is intra prediction and the transform is DCT-2. For example, secondary transform index applied to the luma TB is decoded from the bitstream (1890) only for coding units using intra prediction and a shared coding tree structure. Similarly, the secondary transform index applied to the chroma TBs is decoded from the bitstream (1895) only for coding units using intra prediction and a shared coding tree structure. Operation of steps such as decoding the sub-blocks (1870), inverse quantising the primary transform coefficients (18110) and performing the primary transform can be implemented for inter prediction modes or for intra prediction modes other than for a shared coding tree structure using known methods. Steps 1810 to 1840 are performed in the manner described regardless of prediction mode or structure.

Once the method 1800 terminates, subsequent steps for decoding a coding unit are performed, including generating intra-predicted samples 480 by the module 476, summing the decoded residual samples 448 with the prediction block 452 by the module 450 and application of the in-loop filter module 488 to produce filtered samples 492, output as the frame data 135.

Figures 19A, 19B:
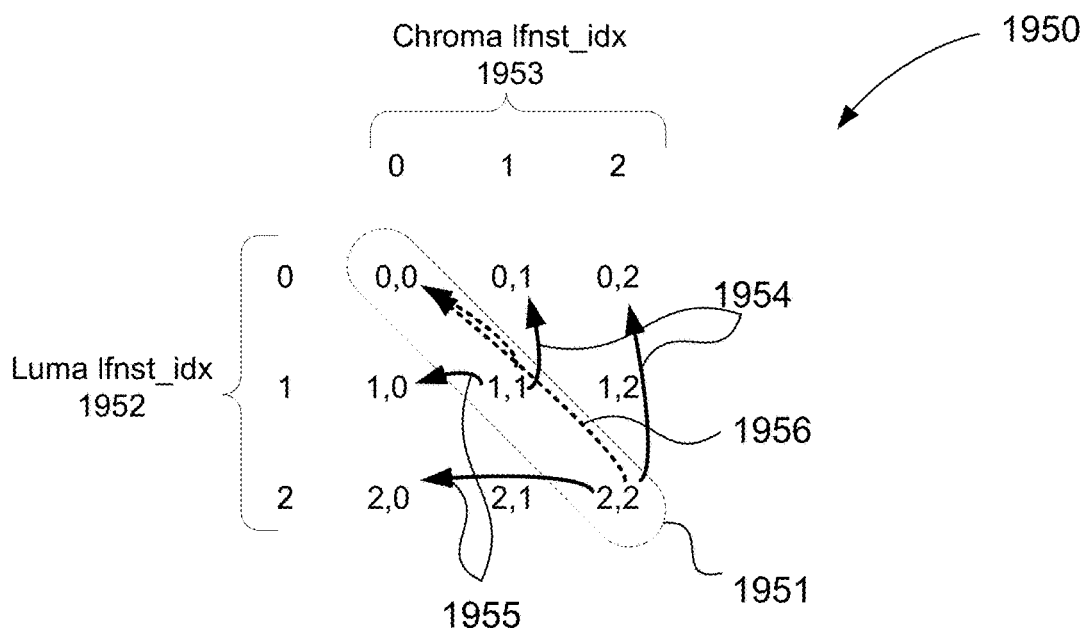
FIGS. 19A and 19B show rules for application or bypassing of the secondary transform to luma and chroma channels.

FIGS. 19A and 19B show rules for application or bypassing of the secondary transform to luma and chroma channels. FIG. 19A shows a table 1900 exemplifying conditions for application of the secondary transform in the luma and chroma channels in a CU resulting from a shared coding tree.

If a last significant coefficient position of a luma TB indicates a decoded significant coefficient that did not result from a forward secondary transform and thus is not subject to inverse secondary transformation, a condition 1901 exists. If a last significant coefficient position of a luma TB indicates a decoded significant coefficient that did result from a forward secondary transform and thus is subject to inverse secondary transformation a condition, 1902 exists. Additionally, for the luma channel, the primary transform type needs to be DCT-2 for the condition 1902 to exist, otherwise condition 1901 exists.

If a last significant coefficient position of the one or two chroma TBs indicates a decoded significant coefficient that did not result from a forward secondary transform and thus is not subject to inverse secondary transformation, a condition 1910 exists. If a last significant coefficient position of the one or two chroma TBs indicates a decoded significant coefficient that did result from a forward secondary transform and thus is subject to inverse secondary transformation, a condition 1911 exists. Additionally, the width and height of a chroma block need to be at least four samples (e.g. chroma subsampling when 4:2:0 or 4:2:2 chroma format is used may result in widths or heights of two samples), for the condition 1911 to exist.

If conditions 1901 and 1910 exist, the secondary transform index is not signalled (either independently or jointly) and is not applied in luma or chroma, i.e. 1920. If conditions 1901 and 1911 exist, one secondary transform index is signalled to indicate application of a selected kernel or bypassing for the luma channel only, i.e. 1921. If conditions 1902 and 1910 exist, one secondary transform index is signalled to indicate application of a selected kernel or bypassing for the chroma channels only, i.e. 1922. If conditions 1911 and 1902 exist, arrangements with independent signalling signal two secondary transform indices, one for the luma TB and one for the chroma TBs, i.e. 1923. Arrangements with a single signalled secondary transform index use one index to control selection for luma and chroma when conditions 1902 and 1911 exist, although the selected kernel also depends on the luma and chroma intra prediction mode, which may differ. The ability to apply the secondary transform to either luma or chroma (i.e. 1921 and 1922) results in coding efficiency gain.

FIG. 19B shows a table 1950 of search options available to the video encoder 114 at the step 1360. Secondary transform indices for luma (1952) and chroma (1953) are shown as 1952 and 1953, respectively. Index value 0 indicates the secondary transform is bypassed and index values 1 and 2 indicate which one of two kernels for the candidate set derived from the luma or chroma intra prediction mode is used. A resulting search space of nine combinations exists ("0,0" to "2,2"), which may be constrained subject to the constraints described with reference to FIG. 19A. Compared to searching all allowable combinations, a simplified search of three combinations (1951) may test just combinations where the luma and chroma secondary transform indices are the same, subject to zeroing the index for the channel for which a last significant coefficient position indicates that a primary-only coefficient exists. For example, when condition 1921 exists, options "1,1" and "2,2" become "0,1" and "0,2", respectively (i.e. 1954). When condition 1922 exists, options "1,1" and "2,2" become "1,0" and "2,0", respectively (i.e. 1955). When condition 1920 exists, there is no need to signal a secondary transform index and the option "0,0" is used. Effectively, conditions 1921 and 1922 allow options "0,1", "0,2", "1,0", and "2,0" in a shared-tree CU, resulting in higher compression efficiency. If these options were prohibited, then either of conditions 1901 or 1910 would lead to condition 1920, that is, options "1,1" and "2,2" would be prohibited, leading to use of "0,0" (sec 1956).

Signalling of quantisation group subdivision level in the slice header provides a higher granularity of control beneath the picture level. The higher granularity of control is advantageous for applications where the encoding fidelity requirements vary from one portion of an image to another and particularly where multiple encoders may need to operate somewhat independently to provide realtime processing capacity. Signalling of quantisation group subdivision level in the slice header is also consistent with signalling partition override settings and scaling list application setting in the slice header.

In one arrangement of the video encoder 114 and the video decoder 134, the secondary transform index for chroma intra predicted blocks is always set to zero, i.e., the secondary transform is not applied for chroma intra predicted blocks. In this event there is no need to signal the chroma secondary transform index and so the steps 15130 and 1895 may be omitted and the steps 1360, 1570, and 18100 are accordingly simplified.

If a node in the coding tree in a shared tree has an area of 64 luma samples, splitting further with a binary or quadtree split will result in smaller luma CBs, such as 4×4 blocks but will not result in a smaller chroma CB. Instead, a single chroma CB of a size corresponding to the area of 64 luma samples, such as a 4×4 chroma CB, is present. Similarly, coding tree nodes with an area of 128 luma samples and subject to a ternary split result in a collection of smaller luma CBs and one chroma CB. Each luma CB has a corresponding luma secondary transform index and the chroma CB has a chroma secondary transform index.

When a node in the coding tree has an area of 64 and a further split is signalled or an area of 128 luma samples and a ternary split is signalled, the split is applied in the luma channel only and the resulting CBs (several luma CBs and one chroma CB for each chroma channel) are either all intra predicted or all inter predicted. When the CU has a width or height of four luma samples and includes one CB for each of colour channel (Y, CB, and Cr) then the chroma CBs of the CU have a width or height of two samples. CBs with a width or height of two samples do not operate with 16-point or 48-point LFNST kernels and so do not require secondary transformation. For blocks with a width or height of two samples, the steps 15130, 1895, 1360, 1570, and 18100 do not need to be performed.

In another arrangement of the video encoder 114 and the video decoder 134 a single secondary transform index is signalled when either or both of luma and chroma contain only non-significant residual coefficients in the region of the respective TBs that is subject to primary transformation only. If the luma TB contains significant residual coefficients in the non-secondary transformed region of the decoded residual (e.g. 1066, 968) or is indicated not to use DCT-2 as the primary transform then the indicated secondary transform kernel (or secondary transform bypass) is applied to the chroma TBs only. If either chroma TB contains significant residual coefficients in the non-secondary transformed region of the decoded residual, the indicated secondary transform kernel (or secondary transform bypass) is applied to the luma TB only. Application of the secondary transform becomes possible for luma TBs even when not possible for chroma TBs and vice versa, giving coding efficiency gain compared to requiring that last positions of all TBs are within the secondary coefficient domain before any TB of the CU can be subject to secondary transformation. Additionally, only one secondary transform index is needed for a CU in a shared coding tree. When the luma primary transform is DCT-2 the secondary transform may be inferred as disabled for chroma as well as for luma.

In another arrangement of the video encoder 114 and the video decoder 134, the secondary transform is applied (by the modules 330 and 436 respectively) to the luma TB only of a CU and not to any chroma TBs of the CU. Absence of secondary transform logic for chroma channels results in less complexity, for example lower execution time or reduced silicon area. Absence of secondary transform logic for chroma channels results in only needing to signal one secondary transform index, which may be signalled after the last position of the luma TB. That is, steps 1590 and 1860 are performed for luma TBs instead of steps 15120 and 1890. Steps 15130 and 1895 are omitted in this event.

In another arrangement of the video encoder 114 and the video decoder 134, the syntax elements defining quantisation group size (i.e. cu_chroma_qp_offset_subdiv and cu_qp_delta_subdiv) are signalled in the PPS 1112. Even if partition constraints are overridden in the slice header 1118, the range of values for the subdivision level is defined according to the partition constraints signalled in the SPS 1110. For example, the range of cu_qp_delta_subdiv and cu_chroma_qp_offset_subdiv is defined as 0 to 2*(log2_ctu_size_minus5+5−(MinQtLog2SizeInterY or MinQtLog2SizeIntraY)+MaxMttDepthY_SPS. The value MaxMttDepthY is derived from the SPS 1110. That is, MaxMttDepthY is set equal to sps_max_mtt_hierarchy_depth_intra_slice_luma when the current slice is an I slice and is set equal to sps_max_mtt_hierarchy_depth_inter_slice when the current slice is a P or a B slice. For a slice with partition constraints overridden to be shallower than the depth as signalled in the SPS 1110, if the quantisation group subdivision level as determined from the PPS 1112 is higher (deeper) than the highest achievable subdivision level under the shallower coding tree depth as determined from the slice header, the quantisation group subdivision level for the slice is clipped to be equal to the highest achievable subdivision level for the slice. For example, for a particular slice cu_qp_delta_subdiv and cu_chroma_qp_offset_subdiv are clipped to be within 0 to 2*(log2_ctu_size_minus5+5−(MinQtLog2SizeInterY or MinQtLog2SizeIntraY)+MaxMttDepth Y_slice_header) and the clipped values are used for the slice. The value MaxMttDepth Y_slice_header is derived from the slice header 1118, that is, MaxMttDepthY_slice_header is set equal to slice_max_mtt_hierarchy_depth_luma.

In yet another arrangement of the video encoder 114 and the video decoder 134 the subdivision level is determined from cu_chroma_qp_offset_subdiv and cu_qp_delta_subdiv decoded from the PPS 1112 to derive a luma and chroma subdivision level. When partition constraints decoded from the slice header 1118 result in a different range of subdivision level for the slice, the subdivision level applied to the slice is adjusted to maintain the same offset relative to the deepest allowed subdivision level according to the partition constraints decoded from the SPS 1110. For example, if the SPS 1110 indicates a maximum subdivision level of 4 and the PPS 1112 indicates a subdivision level of 3 and the slice header 1118 reduces the maximum to 3, then the subdivision level applied within the slice is set as 2 (maintaining an offset of 1 relative to the maximum allowed subdivision level). Adjusting quantisation group area to correspond to changes in partition constraints for specific slices allows signalling subdivision level less frequently (i.e. at the PPS level) while providing a granularity that is adaptive to slice-level partitioning constraint changes. Arrangements where the subdivision level is signalled in the PPS 1112, using a range defined according to partitioning constraints decoded from the SPS 1110, with possible later adjustment based on overridden partition constraints decoded from the slice header 1118, avoid the parsing dependency issue of having PPS syntax elements depending on partition constraints finalised in the slice header 1118.

INDUSTRIAL APPLICABILITY

The arrangements described are applicable to the computer and data processing industries and particularly for the digital signal processing for the encoding a decoding of signals such as video and image signals, achieving high compression efficiency.

The arrangements described herein increase flexibility afforded to video encoders in generating highly compressed bitstreams from incoming video data. The quantisation of different regions or sub-pictures in a frame is able to be controlled at varying granularity, and differing granularity from one region to another, reducing the amount of coded residual data. Higher granularity can accordingly be implemented where required, for example for a 360 degree image as described above.

In some arrangements, application of secondary transform can be controlled independently for luma and chroma as described in relation to steps 15120 and 15130 (and correspondingly steps 1890 and 1895), achieving further reduction in coded residual data. Video decoders are described with necessary functionality to decode bitstreams produced by such video encoders.

The foregoing describes only some embodiments of the present invention, and modifications and/or changes can be made thereto without departing from the scope and spirit of the invention, the embodiments being illustrative and not restrictive.

The invention claimed is:

1. A method of decoding an image including a plurality of coding tree units each comprising one or more coding units from a bitstream using a predetermined manner, the method comprising:

determining a subdivision value for determining a quantisation group in which one quantisation parameter delta is shared, the one quantisation parameter delta representing difference between a quantisation parameter for the quantisation group and a predicted quantisation parameter of the quantisation parameter for the quantisation group, the subdivision value being a value that increases as a number of times a coding tree unit is split into coding units increases, and the quantisation group being capable of including a plurality of coding units;

decoding a predetermined syntax element from the bitstream;

determining a maximum subdivision value for determining the quantisation group according to the predetermined syntax element;

determining the quantisation group by comparing the subdivision value and the maximum subdivision value;

decoding the one quantisation parameter delta for the quantisation group;

deriving the quantisation parameter for the quantisation group according to the one quantisation parameter delta and the predicted quantisation parameter of the quantisation parameter for the quantisation group; and decoding one or more coding units included in the quantisation group using the quantisation parameter for the quantisation group, wherein the maximum subdivision value is limited to a range depending on a first syntax element included in a sequence parameter set of the bitstream, in a case where a slice type is an intra slice and a value of a partition constraint override flag is a first value, wherein the maximum subdivision value is limited to a range depending on a second syntax element included in the sequence parameter set of the bitstream, in a case where a slice type is a P slice or a B slice which is capable of using inter prediction and the value of the partition constraint override flag is the first value, wherein the maximum subdivision value is limited to a range depending on a syntax element which is different from the first and second syntax elements and is capable of being included in a slice header of the bitstream in the predetermined manner, in a case where the value of the partition constraint override flag is a second value different from the first value, wherein the predetermined syntax element for determining the maximum subdivision value is capable of being included in the slice header of the bitstream in the predetermined manner regardless of the value of the partition constraint override flag, and wherein the first syntax element is a sps_max_mtt_hierarchy_depth_intra_slice_luma, and the second syntax element is a sps_max_mtt_hierarchy_depth_inter_slice.

2. The method according to claim 1, wherein the predetermined syntax element is a syntax element of a cu_qp_delta_subdiv.

3. The method according to claim 1, wherein the partition constraint override flag indicates whether partition constraint parameters signaled in the sequence parameter set are to be overridden, and the partition constraint override flag, having the second value, indicates that the partition constraint parameters signaled in the sequence parameter set are to be overridden.

4. The method according to claim 3, the partition constraint parameters signaled in the sequence parameter set includes the first syntax element and the second syntax element.

5. The method according to claim 3, wherein, the syntax element which is different from the first and second syntax elements is included in a data structure which is different from the sequence parameter set, in a case where the syntax element which is different from the first and second syntax elements is not included in the slice header.

6. The method according to claim 1, wherein the sps_max_mtt_hierarchy_depth_intra_slice_luma specifies a maximum hierarchy depth related to multi-tree type splitting in intra slices, and the sps_max_mtt_hierarchy_depth_inter_slice specifies a maximum hierarchy depth related to multi-tree type splitting in inter slices.

7. A method of encoding an image including a plurality of coding tree units each comprising one or more coding units into a bitstream using a predetermined manner, the method comprising:

determining a subdivision value for determining a quantisation group in which one quantisation parameter delta is shared, the one quantisation parameter delta representing difference between a quantisation parameter for the quantisation group and a predicted quantisation parameter of the quantisation parameter for the quantisation group, the subdivision value being a value that increases as a number of times a coding tree unit is split into coding units increases, and the quantisation group being capable of including a plurality of coding units;

determining a maximum subdivision value for determining the quantisation group;

encoding, into the bitstream, a predetermined syntax element for determining the maximum subdivision value in a method of decoding which decodes the bitstream;

determining the quantisation group by comparing the subdivision value and the maximum subdivision value;

encoding the one quantisation parameter delta for the quantisation group into the bitstream; and encoding one or more coding units included in the quantisation group using the quantisation parameter for the quantisation group, wherein the maximum subdivision value is limited to a range depending on a first syntax element included in a sequence parameter set of the bitstream, in a case where a slice type is an intra slice and a value of a partition constraint override flag is a first value, wherein the maximum subdivision value is limited to a range depending on a second syntax element included in the sequence parameter set of the bitstream, in a case where a slice type is a P slice or a B slice which is capable of using inter prediction and the value of the partition constraint override flag is the first value, wherein the maximum subdivision value is limited to a range depending on a syntax element which is different from the first and second syntax elements and is capable of being included in a slice header of the bitstream in the predetermined manner, in a case where the value of the partition constraint override flag is a second value different from the first value, wherein the predetermined syntax element for determining the maximum subdivision value is capable of being included in the slice header of the bitstream in the predetermined manner regardless of the value of the partition constraint override flag, and wherein the first syntax element is a sps_max_mtt_hierarchy_depth_intra_slice_luma, and the second syntax element is a sps_max_mtt_hierarchy_depth_inter_slice.

8. The method according to claim 7, wherein, the predetermined syntax element is a syntax element of a cu_qp_delta_subdiv.

9. The method according to claim 7, wherein the partition constraint override flag indicates whether partition constraint parameters signaled in the sequence parameter set are to be overridden, and the partition constraint override flag, having the second value, indicates that the partition constraint parameters signaled in the sequence parameter set are to be overridden.

10. The method according to claim 9, the partition constraint parameters signaled in the sequence parameter set includes the first syntax element and the second syntax element.

11. The method according to claim 9, wherein, the syntax element which is different from the first and second syntax elements is included in a data structure which is different from the sequence parameter set, in a case where the syntax element which is different from the first and second syntax elements is not included in the slice header.

12. The method according to claim 7, wherein the sps_max_mtt_hierarchy_depth_intra_slice_luma specifies a maximum hierarchy depth related to multi-tree type splitting in intra slices, and the sps_max_mtt_hierarchy_depth_inter_slice specifies a maximum hierarchy depth related to multi-tree type splitting in inter slices.

13. An apparatus for decoding an image including a plurality of coding tree units each comprising one or more coding units from a bitstream using a predetermined manner, the apparatus comprising:

a first determining unit configured to determine a subdivision value for determining a quantisation group in which one quantisation parameter delta is shared, the one quantisation parameter delta representing difference between a quantisation parameter for the quantisation group and a predicted quantisation parameter of the quantisation parameter for the quantisation group, the subdivision value being a value that increases as a number of times a coding tree unit is split into coding units increases, and the quantisation group being capable of including a plurality of coding units;

a first decoding unit configured to decode a predetermined syntax element from the bitstream;

a second determining unit configured to determine a maximum subdivision value for determining the quantisation group according to the predetermined syntax element;

a third determining unit configured to determine the quantisation group by comparing the subdivision value and the maximum subdivision value;

a second decoding unit configured to decode the one quantisation parameter delta for the quantisation group; and a deriving unit configured to derive the quantisation parameter for the quantisation group according to the one quantisation parameter delta and the predicted quantisation parameter of the quantisation parameter for the quantisation group, wherein the decoding unit is configured to decode one or more coding units included in the quantisation group using the quantisation parameter for the quantisation group, wherein the maximum subdivision value is limited to a range depending on a first syntax element included in a sequence parameter set of the bitstream, in a case where a slice type is an intra slice and a value of a partition constraint override flag is a first value, wherein the maximum subdivision value is limited to a range depending on a second syntax element included in the sequence parameter set of the bitstream, in a case where a slice type is a P slice or a B slice which is capable of using inter prediction and the value of the partition constraint override flag is the first value, wherein the maximum subdivision value is limited to a range depending on a syntax element which is different from the first and second syntax elements and is capable of being included in a slice header of the bitstream in the predetermined manner, in a case where the value of the partition constraint override flag is a second value different from the first value, wherein the predetermined syntax element for the maximum subdivision value is capable of being included in the slice header of the bitstream in the predetermined manner regardless of the value of the partition constraint override flag, and wherein the first syntax element is a sps_max_mtt_hierarchy_depth_intra_slice_luma, and the second syntax element is a sps_max_mtt_hierarchy_depth_inter_slice.

14. An apparatus for encoding an image including a plurality of coding tree units each comprising one or more coding units into a bitstream using a predetermined manner, the apparatus comprising:

a first determining unit configured to determine a subdivision value for determining a quantisation group in which one quantisation parameter delta is shared, the one quantisation parameter delta representing difference between a quantisation parameter for the quantisation group and a predicted quantisation parameter of the quantisation parameter for the quantisation group, the subdivision value being a value that increases as a number of times a coding tree unit is split into coding units increases, and the quantisation group being capable of including a plurality of coding units;

a second determining unit configured to determine a maximum subdivision value for determining the quantisation group;

an encoding unit configured to encode, into the bitstream, a predetermined syntax element for determining the maximum subdivision value in a method of decoding which decodes the bitstream; and a third determining unit configured to determine the quantisation group by comparing the subdivision value and the maximum subdivision value, wherein the encoding unit is configured to encode the one quantisation parameter delta for the quantisation group, wherein the encoding unit is configured to encode one or more coding units included in the quantisation group using the quantisation parameter for the quantisation group, wherein the maximum subdivision value is limited to a range depending on a first syntax element included in a sequence parameter set of the bitstream, in a case where a slice type is an intra slice and a value of a partition constraint override flag is a first value, wherein the maximum subdivision value is limited to a range depending on a second syntax element included in the sequence parameter set of the bitstream, in a case where a slice type is a P slice or a B slice which is capable of using inter prediction and the value of the partition constraint override flag is the first value, wherein the maximum subdivision value is limited to a range depending on a syntax element which is different from the first and second syntax elements and is capable of being included in a slice header of the bitstream in the predetermined manner, in a case where the value of the partition constraint override flag is a second value different from the first value, wherein the predetermined syntax element for determining the maximum subdivision value is capable of being included in the slice header of the bitstream in the predetermined manner regardless of the value of the partition constraint override flag, and wherein the first syntax element is a sps_max_mtt_hierarchy_depth_intra_slice_luma, and the second syntax element is a sps_max_mtt_hierarchy_depth_inter_slice.

* * * * *